US012743094B2

(12) United States Patent
Kim et al.

(10) Patent No.: US 12,743,094 B2
(45) Date of Patent: Sep. 22, 2026

(54) ROBOT AND ROBOT CONTROL METHOD

(71) Applicant: SAMSUNG ELECTRONICS CO., LTD., Suwon-si (KR)

(72) Inventors: Hankyeol Kim, Suwon-si (KR); Seungbeom Han, Suwon-si (KR); Kyongsu Kim, Suwon-si (KR); Dongmin Shin, Suwon-si (KR); Sangwuk Chae, Suwon-si (KR); Heewon Chae, Suwon-si (KR); Junu Hong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 60 days.

(21) Appl. No.: 18/639,611

(22) Filed: Apr. 18, 2024

(65) Prior Publication Data

US 2024/0264605 A1 Aug. 8, 2024

Related U.S. Application Data

(63) Continuation of application No. PCT/KR2023/000181, filed on Jan. 4, 2023.

(30) Foreign Application Priority Data

Jan. 5, 2022 (KR) ........................ 10-2022-0001797
Apr. 25, 2022 (KR) ........................ 10-2022-0051071

(51) Int. Cl.
*G05D 1/229* (2024.01)
*G05D 1/243* (2024.01)

(52) U.S. Cl.
CPC .......... *G05D 1/2295* (2024.01); *G05D 1/243* (2024.01)

(58) Field of Classification Search
CPC ... B25J 9/16; B25J 13/08; B25J 19/02; G05D 1/2295; G05D 1/242; G05D 1/243;
(Continued)

(56) References Cited

U.S. PATENT DOCUMENTS 8,543,241 B2 * 9/2013 Hong .................. G05D 1/0246 701/28
9,250,081 B2 2/2016 Gutmann et al.
(Continued)

FOREIGN PATENT DOCUMENTS

JP 7350938 B2 9/2023
JP 7356567 B2 10/2023
(Continued)

OTHER PUBLICATIONS

Communication dated Apr. 5, 2023, issued by the International Searching Authority in International Application No. PCT/KR2023/000181 (PCT/ISA/210).
(Continued)

*Primary Examiner* — Blake A Wood
(74) *Attorney, Agent, or Firm* — Sughrue Mion, PLLC

(57) ABSTRACT

A robot includes: a light and detection ranging ("Lidar") sensor; a driving module; a memory configured to store first map data corresponding to a first traveling space; and at least one processor configured to: acquire sensing data through the Lidar sensor at a traveling start position of the robot, control the driving module to move the robot in a state in which a position corresponding to the traveling start position of the robot is not identified on the first map data based on the acquired sensing data, acquire second map data based on the sensing data acquired through the Lidar sensor while the robot is moving, identify whether a second traveling space corresponding to the second map data matches the first traveling space based on probability information included in
(Continued)

21 21-1 21-2 20

| 0 | 0 | 0 | 0 | 0 | 0 | 0 | 0 | 0 | 0 |
|---|---|---|---|---|---|---|---|---|---|
| 0.8 | 0.8 | 0.8 | 0.8 | 0.8 | 0.8 | 0.8 | 0.8 | 0.2 | 0 |
| 0.8 | 0 | 0 | 0 | 0 | 0 | 0.1 | 0.8 | 0 | 0 |
| 0.8 | 0 | 0 | 0 | 0 | 0.6 | 0.8 | 0.9 | 0.8 | 0.8 |
| 0.7 | 0 | 0 | 0 | 0 | 0 | 0 | 0 | 0 | 0.8 |
| 0.8 | 0 | 0 | 0 | 0 | 0 | 0 | 0 | 0 | 0.8 |
| 0.7 | 0 | 0 | 0 | 0 | 0 | 0 | 0 | 0 | 0.8 |
| 0.8 | 0 | 0 | 0 | 0 | 0 | 0 | 0 | 0 | 0.8 |
| 0.9 | 0.8 | 0.8 | 0.8 | 0.8 | 0.8 | 0.8 | 0.8 | 0.8 | 0.9 |
| 0 | 0 | 0 | 0 | 0 | 0 | 0 | 0 | 0 | 0 |

y x the first map data and position information on one or more objects included in the second map data, and identify the traveling start position of the robot on the first map data based on the traveling start position of the robot on the second map data and the position information on the one or more objects in a state in which it is identified that the second traveling space matches the first traveling space.

18 Claims, 17 Drawing Sheets

(58) Field of Classification Search
CPC ............. G05D 1/2464; G05D 2105/10; G05D 2107/40; G05D 2109/10; G05D 2111/17
See application file for complete search history.

(56) References Cited

U.S. PATENT DOCUMENTS

| | | | | |
|---|---|---|---|---|
| 11,055,341 | B2 | 7/2021 | Eoh et al. | |
| 11,069,133 | B2 | 7/2021 | Yan et al. | |
| 11,468,690 | B2 | 10/2022 | Yuan et al. | |
| 11,700,989 | B2 | 7/2023 | Sim | |
| 2016/0062361 | A1* | 3/2016 | Nakano | G05D 1/0088 701/25 |
| 2018/0246520 | A1* | 8/2018 | Martinson | G05D 1/0094 |
| 2019/0133396 | A1* | 5/2019 | Lim | G05D 1/0246 |
| 2019/0332115 | A1* | 10/2019 | Lim | B25J 19/02 |
| 2021/0018929 | A1 | 1/2021 | Choi | |
| 2021/0104064 | A1 | 4/2021 | Shin et al. | |
| 2021/0149413 | A1* | 5/2021 | Sohn | G06V 20/10 |
| 2022/0408998 | A1 | 12/2022 | Wu | |

FOREIGN PATENT DOCUMENTS

| | | | |
|---|---|---|---|
| KR | 10-2020-0082109 | A | 7/2020 |
| KR | 10-2021-0007474 | A | 1/2021 |
| KR | 10-2021-0009011 | A | 1/2021 |
| KR | 10-2021-0089809 | A | 7/2021 |
| KR | 10-2316097 | B1 | 10/2021 |
| KR | 10-2325119 | B1 | 11/2021 |
| KR | 10-2334641 | B1 | 12/2021 |
| KR | 10-2023-0072070 | A | 5/2023 |

OTHER PUBLICATIONS

Communication dated Apr. 5, 2023, issued by the International Searching Authority in International Application No. PCT/KR2023/000181 (PCT/ISA/237).

* cited by examiner 40
42-4
42-5
2
42-1
42-2
42-3
31
31-1
31-2
31-3
31-4
31-5
30
x
y

FIG. 8

$$\frac{0.8 + 0.8 + 0.8 + 0.8}{100} = 0.032$$

| 0 | 0 | 0 | 0 | 0 | 0 | 0 | 0 | 0 | 0 |
|---|---|---|---|---|---|---|---|---|---|
| 0.8 | 0.8 | 0.8 | 0.8 | 0.8 | 0.8 | 0.8 | 0.8 | 0.2 | 0 |
| 0.8 | 0 |  | 0 | 0 | 0 | 0 | 0.8 | 0 | 0 |
| 0.8 | 0 | 0 | 0 | 0 | 0.5 | 0.8 | 0.9 | 0.8 | 0.8 |
| 0.7 | 0 | 0 | 0 | 0 | 0 | 0 | 0 | 0 | 0.8 |
| 0.8 | 0 | 0 | 0 | 0 | 0 | 0 | 0 | 0 | 0.8 |
| 0.7 | 0 | 0 | 0 | 0 | 0 | 0 | 0 | 0 | 0.8 |
| 0.8 | 0 | 0 | 0 | 0 | 0 | 0 | 0 | 0 | 0.8 |
| 0.9 | 0.8 | 0.8 | 0.8 | 0.8 | 0.8 | 0.8 | 0.8 | 0.8 | 0.9 |
| 0 | 0 | 0 | 0 | 0 | 0 | 0 | 0 | 0 | 0 |

ROBOT AND ROBOT CONTROL METHOD

CROSS-REFERENCE TO RELATED APPLICATIONS

This application is a continuation of International Application No. PCT/KR2023/000181, filed on Jan. 4, 2023, which is based on and claims priority to Korean Patent Application No. 10-2022-0001797, filed on Jan. 5, 2022, in the Korean Intellectual Property Office and Korean Patent Application No. 10-2022-0051071, filed on Apr. 25, 2022, in the Korean Intellectual Property Office, the disclosures of which are incorporated by reference herein in their entireties.

BACKGROUND

1. Field

The disclosure relates to a robot and a control method thereof, and more particularly, to a robot that generates map data according to a change in traveling start position and a robot control method according to generated map data from a change in traveling start position.

2. Description of the Related Art

Recently, there has been technology development for robots that are deployed in indoor spaces and provide services to users. Examples of the robots may include a robot vacuum cleaner that cleans indoor spaces.

The robot cleaning is performed by allowing the robot vacuum cleaner to travel in the indoor space where the robot vacuum cleaner is positioned using map data corresponding to the indoor space stored in a memory. In this case, each time the robot vacuum cleaner repeats traveling, the robot vacuum cleaner may repeatedly collect information on the indoor space, and update the map data based on the collected information. That is, each time the traveling is repeated, the information on the indoor space included in the map data stored in the robot vacuum cleaner may become more accurate, and the map data may include various types of information on objects within the indoor space.

Meanwhile, the robot identifies its traveling start position based on the pre-stored map data and then starts traveling within the indoor space where the robot is positioned according to a preset traveling route. Therefore, in order for the robot to start the traveling within a specific traveling space, a process of identifying the position where the robot starts traveling on the map data should be performed in advance. In this case, when the robot may not identify an initial traveling start position of the robot based on the map data, the robot generates the map data based on a new traveling start position rather than the existing map data.

However, when this process is repeatedly performed each time the traveling start position changes within the same traveling space, it causes the problem of unnecessarily wasting time to generate data. In particular, in the case of the existing map data, as the robot repeats traveling at the same traveling start position, the map data is updated based on data acquired through a sensor, etc., and thus, may include various types of information, but it is inefficient to stop using the existing highly useful map data just by changing the traveling start position. Accordingly, there is a need for a method that may utilize the existing map data even if the traveling start position changes.

SUMMARY

Additional aspects will be set forth in part in the description which follows and, in part, will be apparent from the description, or may be learned by practice of the presented embodiments.

According to an aspect of the disclosure, a robot includes: a light and detection ranging ("Lidar") sensor; a driver including a motor; a memory configured to store first map data corresponding to a first traveling space; and at least one processor configured to: acquire sensing data through the Lidar sensor at a traveling start position of the robot, control the driver to move the robot in a state in which a position corresponding to the traveling start position of the robot is not identified on the first map data based on the acquired sensing data, acquire second map data based on the sensing data acquired through the Lidar sensor while the robot is moving, identify whether a second traveling space corresponding to the second map data matches the first traveling space based on probability information included in the first map data and position information on one or more objects included in the second map data, and identify the traveling start position of the robot on the first map data based on the traveling start position of the robot on the second map data and the position information on the one or more objects in a state in which it is identified that the second traveling space matches the first traveling space.

The at least one processor may be further configured to acquire point map data corresponding to the second traveling space through the Lidar sensor, identify a plurality of points as one or more valid points in a state in which the plurality of points are greater than or equal to a preset probability value among a separate plurality of points included in the point map data, acquire the position information on the one or more objects included in the second map data based on position information of the identified one or more valid points, acquire a matching score between the first map data and the second map data based on the acquired position information on the one or more objects and the probability information, and identify whether the second traveling space matches the first traveling space based on the acquired matching score.

The first map data may be divided into a plurality of areas having a preset size and includes probability information corresponding to each area, and the at least one processor may be further configured to identify areas corresponding to positions of the one or more objects on the first map data based on the position information of the one or more valid points, identify probability values corresponding to the identified areas based on the probability information, and acquire the matching score based on the identified probability values.

In a state in which an average value of the probability values is greater than or equal to a threshold value, the at least one processor may be further configured to identify that the second traveling space matches the first traveling space.

In a state in which the average value of the probability values is less than the threshold value, the at least one processor may be further configured to update the first map data stored in the memory to map data corresponding to the second map data.

The at least one processor may be further configured to rotate the second map data at a preset angle, acquire average values of the probability values each time the second map data rotates at the preset angle, identify a rotation angle corresponding to an average value having a maximum value among the acquired average values of the probability values, identify the traveling start position of the robot on the first map data based on the identified rotation angle, and identify the traveling start position of the robot on the second map data.

The first map data may be divided into a plurality of sub-areas including a preset plurality of areas, and the at least one processor may be further configured to identify a probability value corresponding to any one of the preset plurality of areas included in the plurality of sub-areas, and apply the identified probability value to acquire the matching score when the identified area corresponds to at least one of the plurality of areas in the plurality of sub-areas.

The preset plurality of areas included in the plurality of sub-areas may be determined based on the one or more valid points.

According to another aspect of the disclosure, a method for controlling a robot includes: acquiring sensing data through a light and detection ranging ("Lidar") sensor at a traveling start position of the robot; moving the robot in a state in which a position corresponding to the traveling start position of the robot is not identified on a first map data corresponding to a first traveling space stored in a memory of the robot based on the acquired sensing data, acquiring second map data based on the acquired sensing data through the Lidar sensor while the robot is moving, identifying whether a second traveling space corresponding to the second map data matches the first traveling space based on probability information included in the first map data and position information on one or more objects included in the second map data, and identifying the traveling start position of the robot on the first map data based on the traveling start position of the robot on the second map data and the position information on the one or more objects in a state in which it is identified that the second traveling space matches the first traveling space.

The method for controlling a robot may further include acquiring point map data corresponding to the second traveling space through the Lidar sensor, wherein the identifying whether the second traveling space corresponding to the second map data matches the first traveling space may include identifying a plurality of points as one or more valid points in a state in which the plurality of points are greater than or equal to a preset probability value among a separate plurality of points included in the point map data, acquiring the position information on the one or more objects included in the second map data based on position information of the identified one or more valid points, acquiring a matching score between the first map data and the second map data based on the acquired position information on the one or more objects and the probability information, and identifying whether the second traveling space matches the first traveling space based on the acquired matching score.

The method for controlling a robot more further include dividing the first map data into a plurality of areas having a preset size and including probability information corresponding to each area, wherein the acquiring of the matching score may include identifying areas corresponding to positions of the one or more objects on the first map data based on the position information of the one or more valid points, identifying probability values corresponding to the identified areas based on the probability information, and acquiring the matching score based on the identified probability value.

The identifying of whether the second traveling space matches the first traveling space may include identifying that the second traveling space matches the first traveling space in a state in which an average value of the probability values is greater than or equal to a threshold value.

The identifying of whether the second traveling space matches the first traveling space may further include updating the first map data stored in the memory to map data corresponding to the second map data in a state in which the average value of the probability values is less than the threshold value.

The identifying whether the second traveling space matches the first traveling space may include rotating the second map data at a preset angle, acquiring average values of the probability values each time the second map data rotates at the preset angle, and identifying a rotation angle corresponding to an average value having a maximum value among the acquired average values of the probability values, and the identifying of the traveling start position of the robot on the first map data may include identifying the traveling start position of the robot on the first map data based on the identified rotation angle and the traveling start position of the robot on the second map data.

The method for controlling a robot may further include dividing the first map data into a plurality of sub-areas including a preset plurality of areas, the identifying whether the second traveling space matches the first traveling space may include identifying a probability value corresponding to any one of the preset plurality of areas included in the plurality of sub-areas, and applying the identified probability value to acquire the matching score when the identified area corresponds to one of the plurality of areas in the plurality of sub-areas.

Before the dividing the first map data into a plurality of sub-areas including a preset plurality of areas, the method for controlling the robot may further include determining the preset plurality of areas included in the plurality of sub-areas based on the one or more valid points.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 8 is a diagram for describing identifying whether the second traveling space corresponding to the second map data does not match the first traveling space based on the probability information included in the first map data and the position information on the object included in the second map data, according to one or more embodiments;

FIG. 12 is a diagram illustrating increasing the number of areas included in the sub-area based on the number of valid points, according to one or more embodiments;

DETAILED DESCRIPTION

Figure 1:
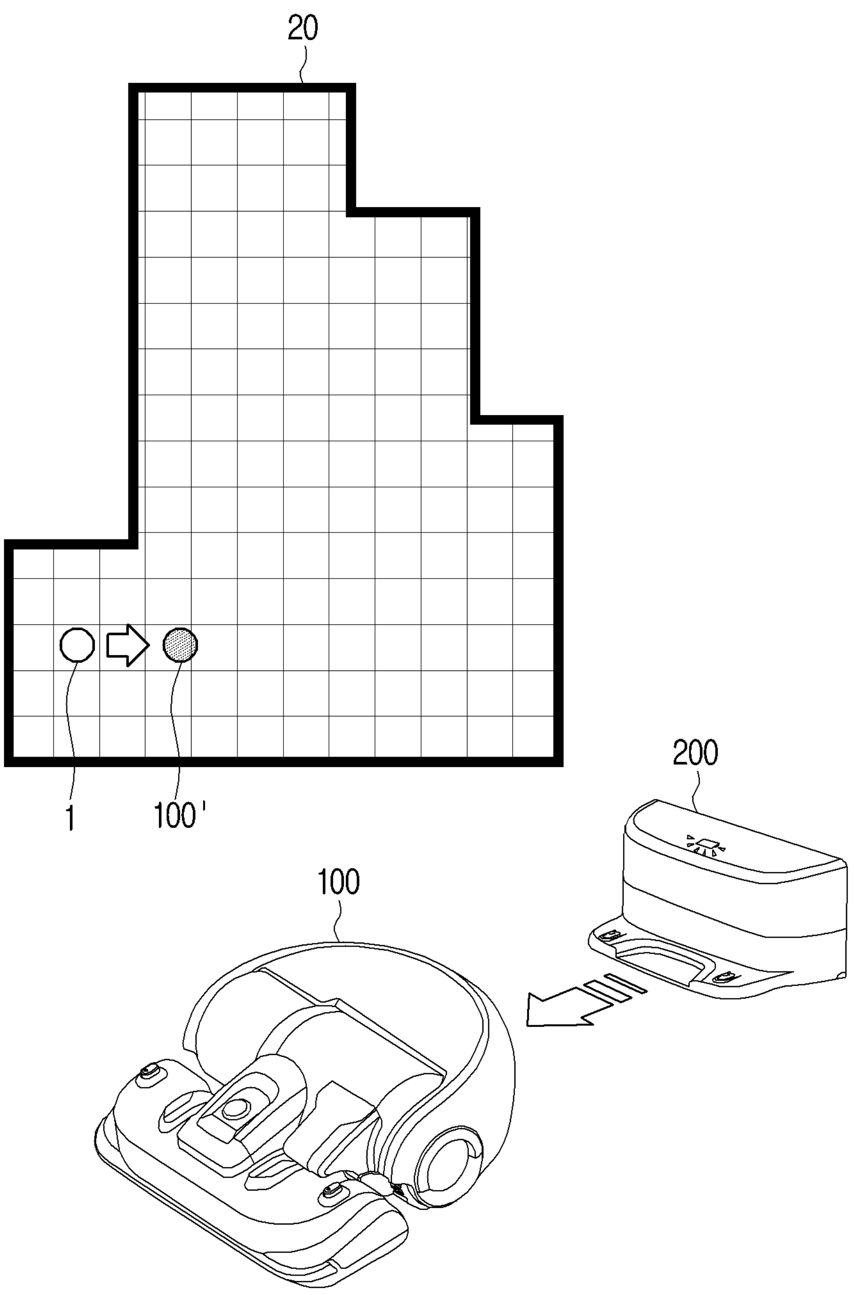
FIG. 1 is a diagram of a robot according to one or more embodiments.

The embodiments described herein are example embodiments, and thus, the disclosure is not limited thereto and embodiments may include various modifications, equivalents, and/or alternatives.

General terms that are currently widely used were selected as terms used in embodiments of the disclosure in consideration of functions in the disclosure, but may change depending on the intention of those skilled in the art or a judicial precedent, the emergence of a new technique, and the like. In addition, in a specific case, terms arbitrarily chosen by an applicant may exist. In this case, the meaning of such terms will be mentioned in detail in a corresponding description portion of the disclosure. Therefore, the terms used in the disclosure should be defined on the basis of the meaning of the terms and the contents throughout the disclosure rather than simple names of the terms.

In the disclosure, an expression "have", "may have", "include", "may include", or the like, indicates existence of a corresponding feature (for example, a numerical value, a function, an operation, a component such as a part, or the like), and does not exclude existence of an additional feature.

An expression "at least one of A and/or B" is to be understood to represent "A" or "B" or "any one of A and B".

Expressions "first", "second", "1st" or "2nd" or the like, used in the disclosure may indicate various components regardless of a sequence and/or importance of the components, will be used only in order to distinguish one component from the other components, and do not limit the corresponding components.

When it is mentioned that any component (for example, a first component) is (operatively or communicatively) coupled with/to or is connected to another component (for example, a second component), it is to be understood that any component is directly coupled to another component or may be coupled to another component through the other component (for example, a third component).

Singular forms are intended to include plural forms unless the context clearly indicates otherwise. It should be understood that terms "include" or "comprise" used in the present specification, specify the presence of features, numerals, steps, operations, components, parts mentioned in the present specification, or combinations thereof, but do not preclude the presence or addition of one or more other features, numerals, steps, operations, components, parts, or combinations thereof.

In the disclosure, a "module" may perform at least one function or operation, and be implemented by hardware or software or be implemented by a combination of hardware and software. In addition, a plurality of "modules" may be integrated in at least one module and be implemented by at least one processor except for a 'module' that needs to be implemented by specific hardware.

In the disclosure, the term "user" may refer to a person using a robot 100 or a device (such as an artificial intelligence electronic device) using the robot 100.

Hereinafter, one or more embodiments will be described in detail with reference to the accompanying drawings.

FIG. 1 is a diagram of a robot according to one or more embodiments.

Referring to FIG. 1, a robot 100 may move on its own within a traveling space and perform various operations. Here, the traveling space refers to a space where a traveling route is set so that the robot 100 may travel. The traveling space may correspond to an indoor space where the robot 100 is positioned.

When the robot 100 first starts traveling within a specific indoor space where the robot 100 is positioned, the robot 100 may collect information on the specific indoor space through various sensors and generate map data corresponding to the specific indoor space based on the collected information. In addition, the robot 100 may set an optimal traveling route for traveling within the specific indoor space based on the map data. In addition, based on the set traveling route and the map data, traveling may be repeated within the specific indoor space and the information included in the map data may be updated.

Meanwhile, before the robot 100 starts traveling based on the map data, the robot 100 may identify its traveling start position on the map data. Specifically, in order to start traveling, the robot 100 identifies the traveling start position of the robot 100 when a command on the start of the traveling is input from a user or when it is identified that preset conditions (e.g., preset traveling start time) for the start of the traveling are satisfied.

In this case, the robot 100 may identify the traveling start position based on the map data. Specifically, when the robot 100 starts traveling, the robot 100 acquires information (e.g., distance information on objects and point cloud data corresponding to objects) on objects around the traveling start position in real time through the light detection and ranging (hereinafter "Lidar") sensor. In addition, the robot 100 compares information on surrounding objects acquired at a preset traveling start position stored in a memory 130 with the information on the surrounding objects acquired in real time through the Lidar sensor. In addition, when the robot 100 identifies that the information on the surrounding objects acquired at the traveling start position stored in the memory 130 matches the information on the surrounding objects acquired in real time through the Lidar sensor, it is identified that the traveling start position of the robot matches the preset traveling start position. In this way, the robot may identify the traveling start position on the map data.

In addition, the robot 100 may identify the traveling start position of the robot 100 on the map data and then start traveling along the preset traveling route based on the identified traveling start position. Therefore, in order for the robot 100 to travel the traveling space, the process of identifying the traveling start position on the map data should be performed first.

When the traveling start position changes, the robot 100 may not identify the changed traveling start position on the existing map data. This is because the information on the surrounding objects acquired at the preset traveling start position does not match the information on the surrounding objects acquired in real time through the Lidar sensor. As a result, the robot 100 may no longer use the traveling route information set based on the preset traveling start position on the existing map data. That is, the robot 100 may no longer use the existing map data when traveling. Accordingly, when the robot 100 may not identify the traveling start position of the robot 100 on the existing map data, the robot 100 acquires new map data based on a new traveling start position. In addition, the robot 100 may set a new traveling route within the traveling space of the robot 100 based on the new map data.

Figure 2:
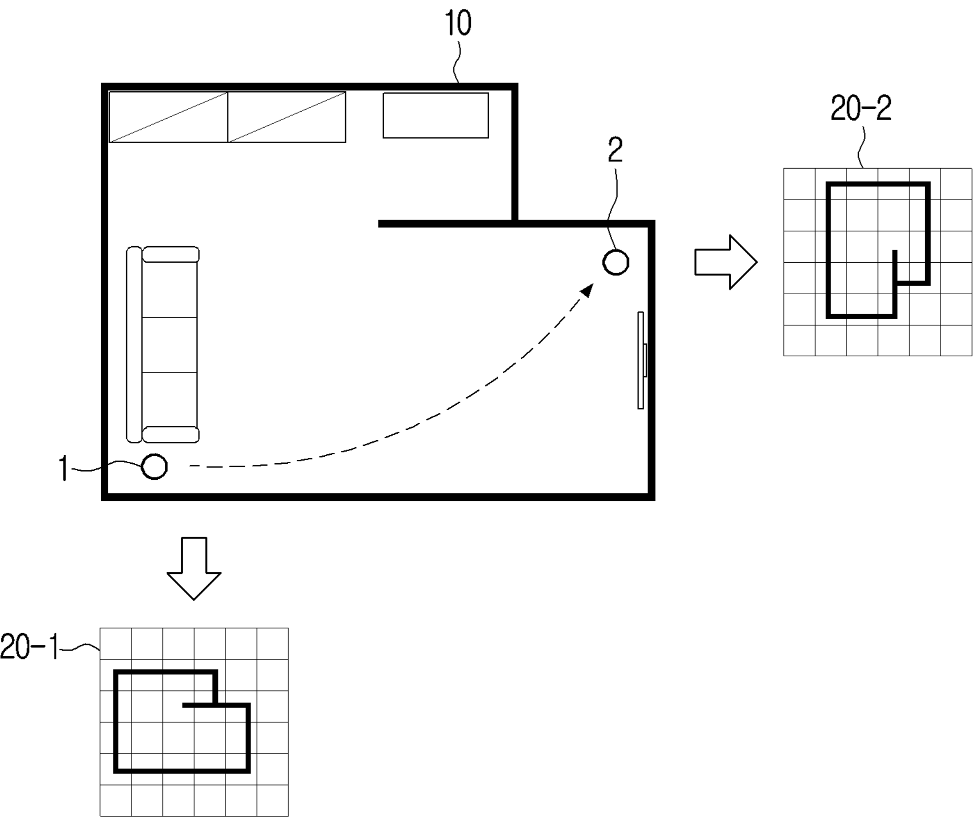
FIG. 2 is a diagram illustrating that map data is regenerated due to a change in traveling start position, even if the robot is positioned in the same traveling space, according to one or more embodiments.

FIG. 2 is a diagram illustrating that the map data is regenerated due to a change in traveling start position, even if the robot is positioned in the same traveling space, according to one or more embodiments.

However, referring to FIG. 2, even if the robot 100 is positioned within the same traveling space 10 and starts traveling within the same traveling space 10, the new map data is repeatedly acquired only by changing the traveling start position, which is inefficient. Specifically, it is assumed that the traveling start position of the robot 100 has changed from a first position 1 to a second position 2 within the same traveling space 10. In this case, the robot 100 may not identify the traveling start position on existing map data 20-1 using the Lidar sensor. Accordingly, the robot 100 determines that it may not use the existing map data 20-1 and acquires new map data 20-2. However, in this case, the existing map data 20-1 and the new map data 20-2 are for the same traveling space 10. In this way, it is inefficient to stop using the existing map data 20-1 and generate the new map data 20-2 each time the traveling start position changes. Accordingly, the present disclosure allows the existing map data to be continuously used when the robot 100 is identified as traveling in the same traveling space even if the traveling start position has changed. Hereinafter, the present disclosure related to this will be described in detail.

Figure 3:
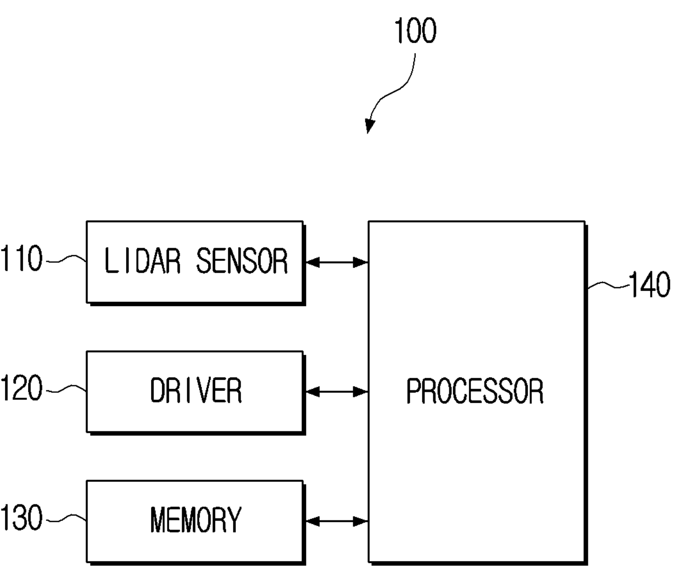
FIG. 3 is a schematic configuration diagram of the robot according to one or more embodiments.

FIG. 3 is a schematic configuration diagram of the robot according to one or more embodiments.

Referring to FIG. 3, the robot 100 may include a Lidar sensor 110, a driver 120, the memory 130, and a processor 140.

In an embodiment of the disclosure, the robot 100 may be implemented as a cleaner. The robot 100 may perform cleaning while traveling in the indoor space where the robot 100 is positioned. In this case, the traveling start position of the robot 100 may be a position of a station 200 of the robot 100. The station 200 may be a device that performs various functions related to the robot 100, such as a battery charging function of the robot 100 and a communication function with a server. When the robot 100 is coupled to the station 200 and receives a user's traveling start command, the robot 100 may identify a position of the station 200 on the map data and identify the identified position of the station as the traveling start position. In addition, the robot 100 may be separated from the station 200 and perform traveling in the indoor space based on the preset traveling route and the map data.

Meanwhile, according to one or more embodiments, the robot 100 may be implemented as a retail robot, a guide robot, etc. The robot 100 may perform a function of guiding a user on a route within a store, explaining products within the store to the user, or following the user within the store while carrying items of the user.

The Lidar sensor 110 may detect distances to objects (e.g., obstacles, etc.) around the robot 100. Specifically, the Lidar sensor 110 rotates 360° and irradiates a laser toward objects around the robot 100, and when the irradiated laser is reflected and received from the objects around the robot 100, the Lidar sensor 110 may detect distances to the objects based on the time when the laser is received, or detect the distances to the objects by measuring the amount of phase change of the received laser. Here, the object may include walls, electronic devices, etc., within the traveling space.

The driver 120 is a component for moving the robot 100. The driver 120 may be implemented as wheels, legs of the robot 100, or the like. To this end, the driver 120 may include a motor. The processor 140 may control the driver 120 to control various driving operations such as movement, stop, speed control, and direction change of the robot 100.

The memory 130 may store data necessary for one or more embodiments of the disclosure. The memory 130 may be implemented in the form of the memory 130 embedded in the robot 100 or in the form of the memory 130 that is detachable from the robot 100 according to data storage purposes. Data for driving the robot 100 may be stored in the memory 130 embedded in the robot 100, and data for extended functions of the robot 100 may be stored in the memory 130 that is detachable from the robot 100. Meanwhile, the memory 130 embedded in the robot 100 may include at least one of a volatile memory (such as, a dynamic random access memory (DRAM), a static RAM (SRAM), a synchronous dynamic RAM (SDRAM), or the like), a non-volatile memory (such as, a one-time programmable read only memory (OTPROM), a programmable ROM (PROM), an erasable and programmable ROM (EPROM), an electrically erasable and programmable ROM (EEPROM), a mask ROM, a flash ROM, or the like), a flash memory (such as, a NAND flash, a NOR flash, or the like), a hard drive, and a solid state drive (SSD)).

In addition, the memory 130 detachable from the robot 100 may be implemented in the form of the memory 130 card (e.g., compact flash (CF), secure digital (SD), micro secure digital (Micro-SD), mini secure digital (Mini-SD), extreme digital (xD), multi-media card (MMC), etc.), external memory (e.g., USB memory 130) connectable to a USB port, and the like.

According to one or more embodiments, the map data may be stored in the memory 130. The map data may refer to the map data acquired for the traveling space where the robot 100 is positioned. The map data may include information on the traveling space. The position information, etc., of the objects (e.g., walls, home appliances, etc.) within the traveling space may be included.

Meanwhile, the map data stored in the memory 130 may be the map data that is acquired after the robot 100 starts its first traveling to the traveling space where the robot 100 is positioned and stored in the memory 130. Specifically, when the robot 100 first starts traveling within the specific traveling space, the processor 140 may acquire sensing data for the specific traveling space using the Lidar sensor 110. In addition, the processor 140 may generate the map data for the specific traveling space using the acquired sensing data, and store the generated map data in the memory 130.

Meanwhile, when the processor 140 identifies that the traveling space where the robot 100 is positioned has changed, the processor 140 may generate new map data for the new traveling space, delete the map data previously stored in the memory 130, and then store the new map data. Accordingly, the map data stored in the memory 130 may continue to be stored in the memory 130 as long as the traveling space where the robot 100 is positioned does not change.

Hereinafter, by identifying that the traveling space where the robot 100 is positioned has changed, the new map data newly generated by the processor 140 is distinguished from the map data stored in the memory 130. To this end, the map data stored in the memory 130 is referred to as first map data 20, and by identifying that the traveling space where the robot 100 is positioned has changed, the new map data newly generated by the processor 140 is referred to as second map data 30.

Meanwhile, the robot 100 may repeatedly travel the traveling space where the robot 100 is positioned using the first map data 20 stored in the memory 130. The processor 140 may update the first map data 20 stored in the memory 130 based on the sensing data acquired each time the traveling is repeated. In addition, the processor 140 may receive additional information (e.g., identification information of an electronic device, etc.) on a first traveling space from a user through an input interface, and may also update the first map data 20 based on the received additional information.

The processor 140 controls the overall operation of the robot 100. Specifically, the processor 140 may be connected to the components of the robot 100, including the Lidar sensor 110 and the driver 120, and may generally control the operation of the robot 100.

To this end, the processor 140 may be electrically connected to the Lidar sensor 110 and the driver 120. In addition, the processor 140 may include a central processing unit (CPU), an application processor (AP), etc. In this case, the processor 140 may execute one or more software programs stored in the memory 130 according to one or more instructions, control operations of various types of hardware provided in the robot 100, and support various functions.

In particular, as described above, the processor 140 may acquire the map data for the traveling space where the robot 100 is positioned based on the sensing data acquired through the Lidar sensor 110. When the robot 100 is implemented as a robot vacuum cleaner, the processor 140 may use the Lidar sensor 110 to acquire map data for home, company, etc., of a user which are spaces where the robot vacuum cleaner is positioned and where the robot vacuum cleaner is set to travel.

According to one or more embodiments, when the robot 100 is implemented as a robot 100 that provides services within a store, the processor 140 may use the Lidar sensor 110 to acquire the map data for the store where the robot 100 is positioned. Meanwhile, the processor 140 may identify the real-time position of the robot 100 based on the acquired map data. In this case, the process of generating the map data of the processor 140 and the process of identifying the position of the robot 100 may be performed simultaneously.

Describing in more detail the process of generating, by the processor 140, the map data, the processor 140 may use the Lidar sensor 110 to acquire distance data between the robot 100 and the objects around the robot 100 and point cloud data corresponding to the surrounding objects.

Specifically, the processor 140 irradiates a laser toward an object, and when the irradiated laser is reflected and received from the object, the processor 140 may identify the distance to the object based on the time when the laser is received. In addition, the processor 140 may identify a point corresponding to a point where the laser is reflected based on the identified distance. In this case, the point may be identified on a surface of the object. In addition, the processor 140 may identify a point set in which a plurality of points identified on a surface of the object are clustered. In this case, the set of the plurality of points identified on the surface of the object may correspond to a cloud point.

In this case, the processor 140 may acquire the distance data between the robot 100 and the objects around the robot 100 and the point cloud data corresponding to the surrounding objects in the form of the point map data. The point map data may include a point cloud corresponding to the traveling space and point clouds for objects positioned in the traveling space.

In this case, positions of each point cloud may be identified on the point map data to correspond to the positions of the objects within the traveling space, based on the acquired distance data. Meanwhile, the processor 140 may apply a simultaneous localization and mapping (SLAM) algorithm to the acquired map data of the traveling space to acquire the map data for the traveling space. The processor 140 may generate the map data through techniques such as GraphSLAM, Cartographer, Gmapping, and EKF SLAM.

Hereinafter, the operation of the robot according to one or more embodiments of the disclosure will be described in more detail with reference to FIGS. 4 through 12.

First, the processor 140 acquires the sensing data through the Lidar sensor 110 at the traveling start position of the robot 100.

Here, the traveling start position may be a current position of the robot 100 at the time when the robot 100 starts traveling. The traveling start position may refer to the current position of the robot 100 when the robot 100, which is in an off state or in a standby state for a preset time, receives a traveling start command of a user or when traveling start setting conditions (e.g., when the preset traveling start time arrives) are identified as being satisfied. The traveling start position may refer to the current position of the a position of a station 200 of the robot 100.

The processor 140 uses the Lidar sensor 110 to acquire sensing data for the surrounding objects at the traveling start position of the robot 100. As described above, the sensing data may include the distance data between the robot 100 and the objects around the robot 100 and the point cloud data for the surrounding objects.

Specifically, the processor 140 may acquire information for identifying a position corresponding to the traveling start position of the robot 100 on the first map data 20 stored in the memory 130. The processor 140 may control the driver 120 so that the robot 100 rotates 360° at the traveling start position, and acquire sensing data for the objects around the traveling start position while the robot 100 rotates 360°. Alternatively, the processor 140 may control the driver 120 so that the robot 100 travels within a preset radius from the traveling start position, and use the Lidar sensor 110 while the robot is traveling to acquire the sensing data for the surrounding objects at the traveling start position.

In this way, the sensing data acquired at the traveling start position may then be used to identify the position corresponding to the traveling start position on the first map data 20.

After acquiring the sensing data from the traveling start position of the robot 100, the processor 140 may identify the position corresponding to the traveling start position of the robot on the first map data 20 based on the acquired sensing data, and control the driver 120 so that the robot travels when the position corresponding to the traveling start position of the robot is not identified on the first map data 20.

Specifically, the processor 140 may identify the position corresponding to the traveling start position of the robot 100 on the first map data 20 based on the sensing data acquired through the Lidar sensor 110.

Here, identifying the position corresponding to the traveling start position of the robot 100 may refer to identifying whether the robot 100 is currently positioned at a traveling start position 1 set on the first map data 20. Hereinafter, for convenience of description, the traveling start position 1 set on the first map data 20 is referred to as a first traveling start position.

Specifically, the processor 140 uses the Lidar sensor 110 to acquire the information (i.e., distance data between the robot 100 and the objects around the robot 100 and point cloud data corresponding to the surrounding objects) on the objects around the robot 100. In this case, the information on the surrounding objects may be acquired before the robot 100 travels or at the time when the robot 100 starts traveling.

In addition, the processor 140 may identify the position corresponding to the traveling start position of the robot 100 on the first map data 20 stored in the memory 130, based on the acquired information on the surrounding objects.

Specifically, the processor 140 may identify whether the current position of the robot 100, which is the traveling start position of the robot 100, matches the first traveling start position 1 set on the first map data 20, and thus, identify the position corresponding to the traveling start position of the robot 100.

Specifically, the processor 140 may use the Lidar sensor 110 to compare the information (e.g., distance data for the objects around the robot 100 and point cloud data corresponding to the objects) on the surrounding objects acquired from the current position of the robot 100 and the information (e.g., distance data for the objects around the first traveling start position 1 and point cloud data corresponding to the objects) acquired from the first travel start position 1 on the first map data 20, thereby identifying whether the current position of the robot 100 matches the first travel start position 1.

In this case, the information acquired at the first traveling start position 1 may be acquired through the Lidar sensor 110 when the robot 100 is positioned at the first traveling start position 1, and the processor 140 may store the acquired information in the memory 130.

In addition, when it is identified that the current position of the robot 100 matches the first traveling start position 1, the processor 140 may identify that the robot 100 is positioned at the first traveling start position 1.

Meanwhile, when the current position of the robot 100 does not match the first traveling start position 1, the processor 140 may identify that the robot 100 is not positioned at the first traveling start position 1.

Meanwhile, when the processor 140 identifies that the current position of the robot 100 does not match the first traveling start position 1 on the first map data 20, the processor 140 may identify that the robot 100 is positioned in a second traveling space, which is a new traveling space, rather than the first traveling space corresponding to the first map data 20 stored in the memory 130. That is, the processor 140 may identify that the traveling space where the robot is positioned has changed.

The processor 140 may control the driver 120 so that the robot 100 travels within the second traveling space. Specifically, the processor 140 may transmit a control signal to the motor included in the driver 120, drive the driver 120 through the motor, and move the robot 100 within the second traveling space by the driving of the driver 120.

In addition, the processor 140 may acquire second map data 30 based on sensing data acquired through the Lidar sensor 110 while the robot is traveling.

Specifically, when the processor 140 identifies that the traveling start position of the robot 100 does not match the first traveling start position 1, the processor 140 may identify that the space where the robot 100 is positioned has changed from the first traveling space corresponding to the existing first map data 20 to the second traveling space which is a new traveling space. In addition, the processor 140 may identify the traveling start position of the robot 100 as the traveling start position in the second traveling space which is the new traveling space. Hereinafter, the traveling start position for the second traveling space is referred to as a second traveling start position 2.

The processor 140 controls the driver 120 so that the robot 100 travels at the second traveling start position 2 and acquire data for generating the new map data (i.e., the second map data 30) for the second traveling space. Specifically, the processor 140 may use the Lidar sensor 110 to acquire sensing data for the second traveling space and objects within the second traveling space. The processor 140 may use the Lidar sensor 110 to acquire the distance data and point cloud data between the robot 100 and the objects around the robot 100 in the second traveling space, and generate the second map data 30 based on the acquired distance data and point cloud data.

Figure 4:
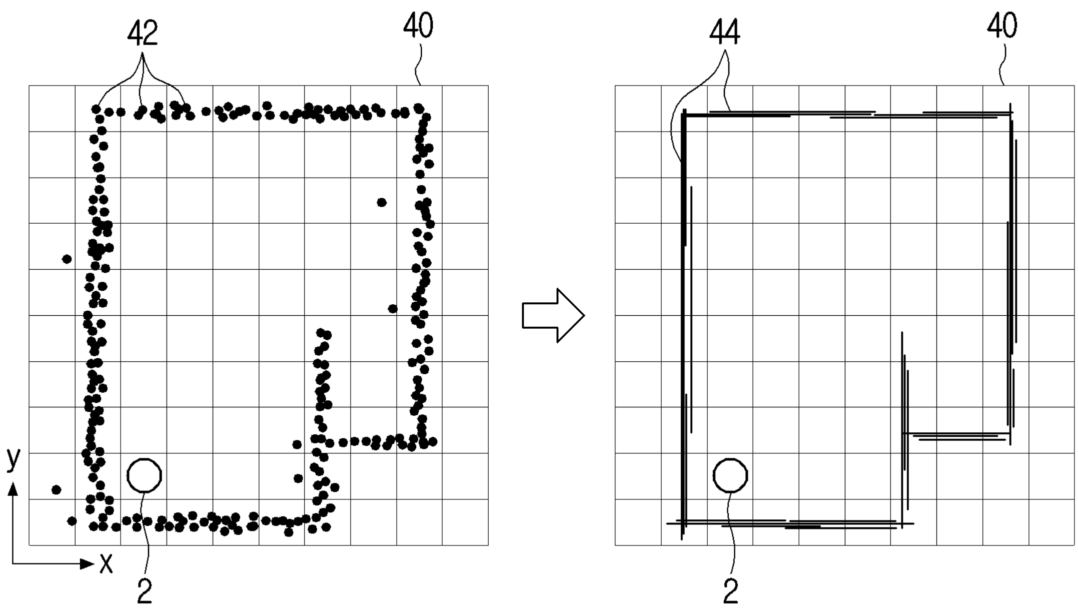
FIG. 4 is a diagram illustrating acquiring distance data and point cloud data for an object using a Lidar sensor, according to one or more embodiments.

FIG. 4 is a diagram illustrating acquiring the distance data and point cloud data for the object using the Lidar sensor, according to one or more embodiments.

Specifically, referring to FIG. 4, the processor 140 may use the Lidar sensor 110 to acquire a line data 44 corresponding to an object having a line shape based on the acquired distance data and point cloud data. Specifically, the processor 140 may use the Lidar sensor 110 to acquire the distance data between the robot 100 and the objects around the robot 100 within the second traveling space. In addition, the processor 140 may acquire point cloud data 42 in which each point where the laser irradiated from the Lidar sensor 110 is reflected from the object is expressed as a point having coordinate values in a two-dimensional space. In addition, the processor 140 may acquire a point cloud map for the second traveling space based on the acquired distance data and point cloud data 42. Hereinafter, for convenience of description, the point cloud map is referred to as a point map data (e.g., second the point map data) 40.

The processor 140 may acquire a plurality of straight line components corresponding to the point cloud data 42 on the acquired point cloud map. Specifically, the processor 140 may extract the plurality of straight line components from the point cloud data 42. In addition, the processor 140 may acquire the line data 44 corresponding to the object having the line shape through clustering of the plurality of extracted straight lines. Meanwhile, the processor 140 may extract the straight line components from the point cloud data 42 using various straight line detection algorithms (e.g., Hough transform, HoughLines function, etc.).

Meanwhile, the processor 140 may identify a position of the line data 44 on the point map data 40 based on coordinate values of the point cloud data. In addition, the processor 140 may identify a position of the identified line data 44 as a position of an object corresponding to the line data 44. In addition, the processor 140 may acquire the line data 44 corresponding to an object in the second traveling space on the point cloud map data and then apply the SLAM algorithm to the point cloud map data to acquire the second map data 30.

Meanwhile, in an embodiment of the disclosure, the processor 140 may acquire the second map data 30 and then identify whether the second traveling space corresponding to the second map data 30 matches the first traveling space based on probability information included in the first map data 20 and position information on an object included in the second map data 30.

Specifically, the processor 140 may identify the position of the object on the second map data 30 based on the position information on the object included in the second map data 30. The processor 140 may identify coordinate values corresponding to the position of the object in the second map data 30.

In addition, the processor 140 may identify the position of the object on the identified second map data 30 and the corresponding position on the first map data 20. Here, by identifying the position of the object and the corresponding position on the first map data 20, it may be determined whether the object identified on the second map data 30 is identified on the first map data 20. That is, it is a process (localization) of recognizing the position of the object on the second map data 30 as the position on the first map data 20, so that it may be determined that the object identified on the second map data 30 is recognized on the first map data 20.

Meanwhile, the processor 140 may use the probability information included in the first map data 20 to determine whether the object identified on the second map data 30 is identified on the first map data 20. Here, the probability information may be a probability value that an object may exist at a specific position on the first map data 20.

The processor 140 may identify based on the probability information that the first map data 20 and the second map data 30 correspond to the same traveling space when it is identified that an object exists in the position identified on the first map data 20. That is, the processor 140 may identify that the first traveling space corresponding to the first map data 20 matches the second traveling space corresponding to the second map data 30. In a state in which a plurality of walls, structures, etc., identified on the second map data 30 are also identified on the first map data 20, the processor 140 may identify that the first traveling space matches the second traveling space.

Hereinafter, map data according to one or more embodiments will be described with reference to FIG. 5.

Figure 5:
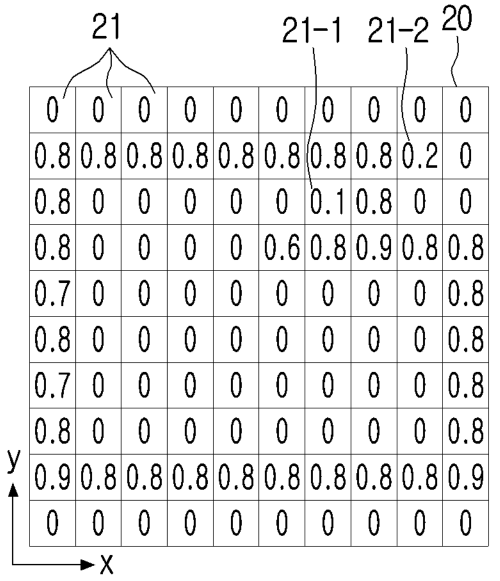
FIG. 5 is a diagram for describing the map data according to one or more embodiments.
Figure 5:
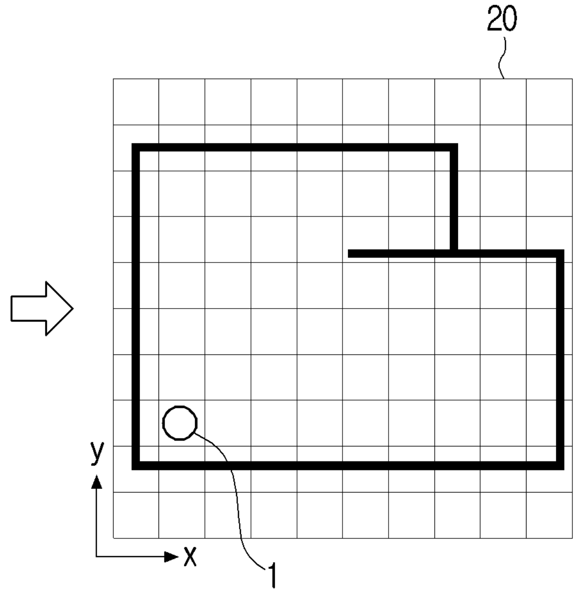

FIG. 5 is a diagram for describing the map data according to one or more embodiments.

According to an embodiment of the disclosure, the first map data 20 (or the second map data 30) may include probability information on the probability that an object exists at a specific position on the map data. In addition, the second map data 30 (or the first map data 20) may include the position information on the object.

Referring to FIG. 5, the first map data 20 acquired by applying the SLAM algorithm to the point map data (e.g., first the point map data) acquired through the Lidar sensor 110 may be divided into a plurality of areas having a preset size. In this case, the first map data 20 may include probability information corresponding to each area. Specifically, the processor 140 may acquire the point map data based on the sensing data acquired through the Lidar sensor 110, and apply the SLAM algorithm to the acquired point map data to acquire the first map data for the first traveling space.

In this case, the acquired first map data 20 may be divided into a plurality of grid lines and divided into a plurality of areas 21 having a preset size. In addition, the first map data 20 may include probability information corresponding to each area 21. Here, the probability information corresponding to each area 21 may be a probability value that an object may exist in each area. In addition, the processor 140 may identify an area where the probability value is greater than or equal to a preset value as an object existing in the corresponding area.

Referring to FIG. 5, according to one or more embodiments, the processor 140 may identify that an object exists only in areas where the probability value is 0.6 or more, based on the probability information corresponding to each area included in the acquired first map data 20. Accordingly, the processor 140 may identify that no object exists in a first area 21-1 having a probability value of 0.1 and a second area 21-2 having a probability value of 0.2. In addition, the processor 140 may identify the position of the object within the first traveling space based on the position information or coordinate information of each area where the object is identified as being present. Accordingly, the position information on the object included in the first map data 20 may correspond to the position information or coordinate information of each area identified based on the probability information.

Meanwhile, the description of the first map data 20 described above may be equally applied to the second map data 30. Accordingly, the processor 140 may identify the position of the object within the second traveling space based on the second map data 30.

Meanwhile, according to one or more embodiments, the first map data 20 and the second map data 30 may be divided into the same number of plurality of areas. In addition, the shapes of the plurality of areas dividing the first map data 20 and the second map data 30 may be the same. When the first map data 20 stored in the memory 130 is divided into 100 areas in the form of 10×10, the second map data 30 newly acquired by the processor 140 through the Lidar sensor 110 may be divided into 100 areas in the form of 10×10.

Meanwhile, the processor 140 may select only valid points from the point cloud used to generate the second map data 30 in order to identify the position of the object within the second traveling space.

To this end, according to one or more embodiments, the processor 140 may acquire the point map data 40 corresponding to the second traveling space through the Lidar sensor 110, identify a plurality of points included in the point map data 40 that are greater than or equal to a preset probability value as valid points, and may acquire the position information on the object included in the second map data 30 based on the position information of the identified valid point. The preset probability value may be a value among a separate a plurality of points included in the point map data In addition, the processor 140 may acquire a matching score between the first map data 20 and the second map data 30 based on the position information on the object included in the second map data 30 acquired based on position information of the valid point and the probability information included in the first map data 20. In addition, the processor 140 may identify whether the second traveling space matches the first traveling space based on the acquired matching score. Hereinafter, one or more embodiments related to this will be described in detail.

Specifically, the processor 140 may use the Lidar sensor 110 to acquire the sensing data for the second traveling space and acquire the point map data 40 for the second traveling space based on the acquired sensing data. Here, the point map data 40 may be a point cloud map of the second traveling space acquired by the robot 100 through the Lidar sensor. Specifically, the processor 140 may acquire the distance data and point cloud data 42 regarding the second traveling space using the Lidar sensor 110 while the robot 100 travels the second traveling space. In addition, the point cloud map including the acquired distance data and point cloud data 42 may be acquired. The method of acquiring, the processor 140, the point cloud map for the traveling space has been described above and will be omitted.

Figure 6:
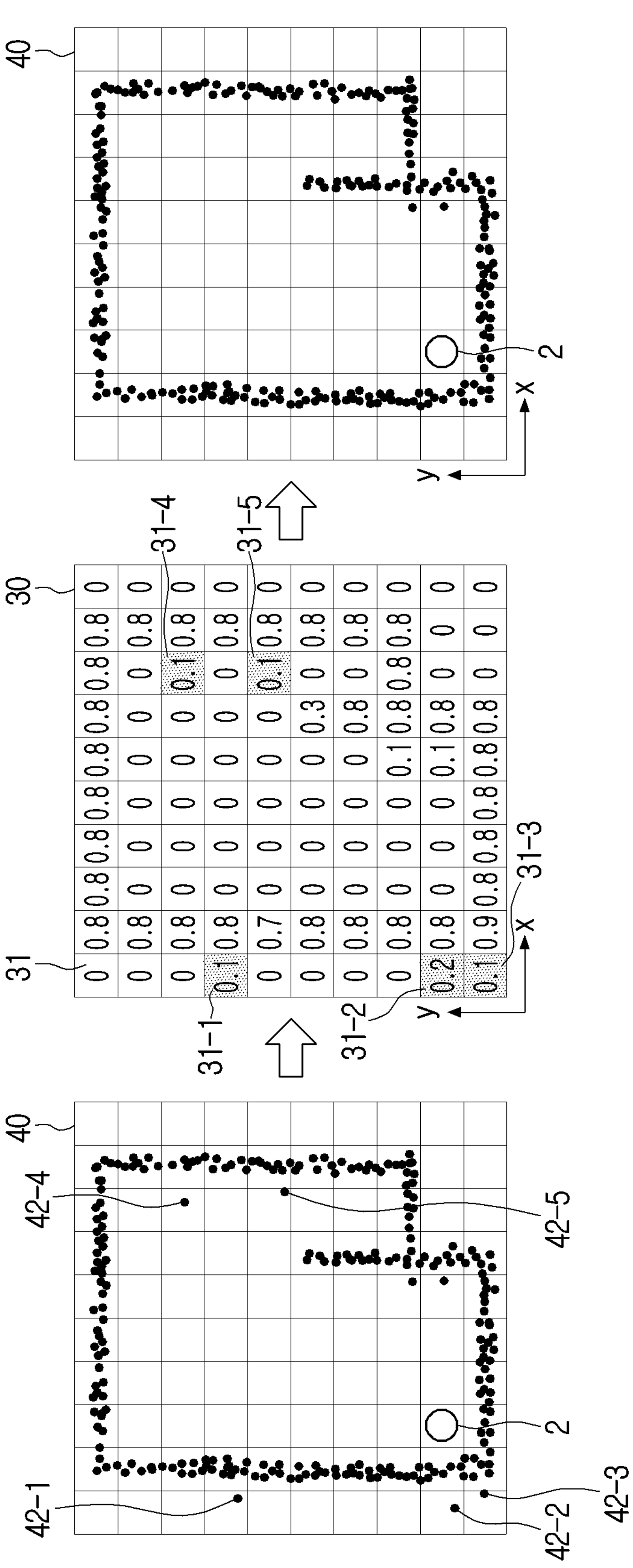
FIG. 6 is a diagram illustrating identifying a valid point and identifying a position of an object on second map data based on the identified valid point, according to one or more embodiments.

FIG. 6 is a diagram illustrating identifying the valid point and identifying the position of the object on the second map data based on the identified valid point, according to one or more embodiments.

In addition, the processor 140 may acquire the second map data 30 by applying the SLAM algorithm to the acquired point map data 40. In addition, the processor 140 may identify valid points among the point cloud included in the point map data 40 and a plurality of points constituting the point cloud, based on the probability information included in the acquired second map data 30.

Referring to FIG. 6, according to one or more embodiments, it is assumed that the preset probability value, which is a standard for identifying the valid point, is 0.3. In this case, the processor 140 may identify an area having a probability value of 0.3 or less among a plurality of areas 31 in the second map data 30. More specifically, among the plurality of areas 31 in the second map data 30, four areas 31-1, 31-3, 31-4, and 31-5 having a probability value of 0.1 and one area 31-2 having a probability value of 0.2 may be identified. In addition, the processor 140 may identify the remaining points except for points 42-1 through 42-5 included in the identified areas 31-1 through 31-5 as the valid points on the point map data 40. That is, the processor 140 may remove points included in an area having a probability value less than the preset probability value on the point map data 40 and then identify only the remaining points as the valid points.

In addition, the processor 140 may identify the position of the object included in the second map data 30 based on the position information of the valid point. Specifically, the processor 140 may identify coordinate values of the valid point on the point map data 40 and identify a position of an area corresponding to the identified coordinate values on the second map data 30. In addition, the processor 140 may identify that the object is positioned in the area identified on the second map data 30.

Meanwhile, according to one or more embodiments, the processor 140 may acquire the matching score between the first map data 20 and the second map data 30 based on the position information of the valid point identified on the second map data 30 and the probability information included in the first map data 20.

Here, the matching score may be a value indicating the matching degree between the first map data 20 and the second map data 30. Specifically, when the matching score is greater than or equal to the threshold value, the processor 140 may identify that an object identified in the second traveling space also exists in the first traveling space. In addition, when the object identified in the second traveling space is identified as existing in the first traveling space, the processor 140 may identify that the first map data 20 matches the second map data 30. In addition, when the processor 140 identifies that the first map data 20 matches the second map data 30, the processor 140 may identify that the first traveling space corresponding to the first map data 20 matches the second map data 30 corresponding to the second map data 30.

Meanwhile, when the matching score is less than the threshold, the processor 140 may identify that the first traveling space does not match the second traveling space.

Hereinafter, one or more embodiments for acquiring the matching score will be described.

Figure 7:
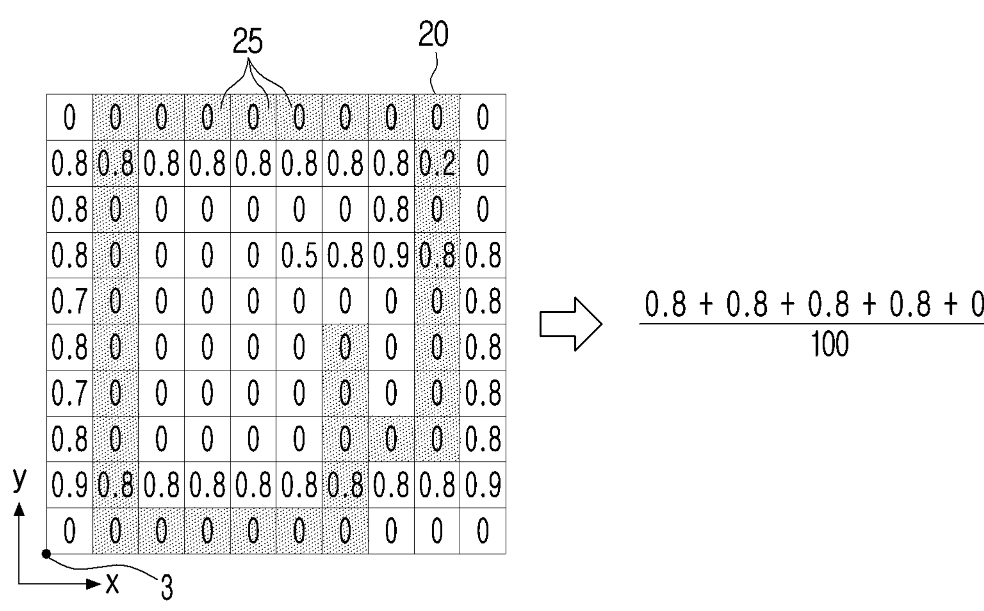
FIG. 7 is a diagram for describing identifying whether a second traveling space corresponding to the second map data matches a first traveling space based on probability information included in first map data and position information on an object included in second map data, according to one or more embodiments.

FIG. 7 is a diagram for describing identifying whether the second traveling space corresponding to the second map data matches the first traveling space based on the probability information included in the first map data and the position information on the object included in the second map data, according to one or more embodiments.

According to one or more embodiments, the processor 140 may identify an area 25 corresponding to the position of the object in the second map data 30 on the first map data 20 based on the position information of the valid point. In addition, the processor 140 may identify a probability value corresponding to the identified area 25 based on the probability information included in the first map data 20. In addition, the processor 140 may acquire the matching score based on the identified probability value.

Meanwhile, according to one or more embodiments, the matching score may be an average value of probability values corresponding to each of the identified plurality of areas 25. In addition, the average value may be a value obtained by dividing a total sum of probability values by the number of plural areas in the first map data 20.

Specifically, the processor 140 may first perform a process of recognizing the position of the identified object in the second traveling space on the first map data 20. To this end, the processor 140 may use the position information on the object in the second traveling space included in the second map data 30.

Specifically, the processor 140 may identify the position of the object on the second map data 30 and the corresponding area on the second map data 30, based on the position information of the valid point in the point map data 40. In addition, the processor 140 may identify the area 25 on the first map data 20 that corresponds to the area on the identified second map data 30. It is assumed that the processor 140 has identified that an object exists in an area corresponding to a (2, 1) coordinate value and a (2, 2) coordinate value on the second map data 30. In this case, the processor 140 may identify that an object is positioned in an area corresponding to the same (2, 1) coordinate value and an area corresponding to the (2, 2) coordinate value on the first map data 20. In addition, the processor 140 may identify a probability value of the area corresponding to the (2, 1) coordinate value identified on the first map data 20 and a probability value of the area corresponding to the (2, 2) coordinate value. In addition, the processor 140 may calculate an average value of the plurality of identified probability values and identify the calculated average value as a matching score between the first map data 20 and the second map data 30.

In this case, according to one or more embodiments, the processor 140 may identify that the second traveling space matches the first traveling space when the average value of the probability value is greater than or equal to the threshold value.

Specifically, the processor 140 may identify that the object in the second map data 30 is included in the first map data 20 when the average value of the probability value corresponding to the matching score is greater than or equal to the preset value. That is, it may be identified that the object included in the second traveling space is equally included in the first traveling space. Accordingly, the processor 140 may identify that the first traveling space matches the second traveling space.

More specifically, referring to FIG. 7, the shaded area among the plurality of areas in the first map data 20 may be the position (or area) 25 corresponding to the position (or area) of the object identified on the first map data 20. The processor 140 may identify probability values for each of the plurality of shaded areas 25 among the plurality of areas in the first map data 20. In addition, the processor 140 may acquire the average value of the plurality of identified probability values. In addition, the processor 140 may identify the acquired average value as the matching score. Specifically, the processor 140 may acquire an average value (0.034) by dividing the total sum (3.4) of the plurality of identified probability values by the number 100 of plural areas dividing the first map data 20. In addition, the processor 140 may acquire the acquired average value as a matching score (0.034). In this case, assuming that the threshold value, which is a standard for determining that the first traveling space matches the second traveling space, is 0.033, the processor 140 may identify that the first traveling space corresponding to the first map data 20 matches the second traveling space corresponding to the second map data 30.

Meanwhile, according to one or more embodiments, when it is identified that the average value of the probability value is less than the threshold value, the processor 140 may update the first map data 20 stored in the memory 130 to the second map data 30.

Specifically, when it is identified that the average value of the probability value corresponding to the matching score is less than the threshold value, the processor 140 may identify that the first traveling space does not match the second traveling space. That is, the processor 140 may identify that the robot 100 is positioned in a new traveling space. Accordingly, the processor 140 may update the first map data 20 for the existing first traveling space stored in the memory 130 to the second map data 30 for the second traveling space, which is a new traveling space. That is, the processor 140 may delete the first map data 20 stored in the memory 130 and store the second map data 30. In this way, the processor 140 may control the robot 100 to travel within the second traveling space using the second map data 30.

FIG. 8 is a diagram for describing identifying whether the second traveling space corresponding to the second map data does not match the first traveling space based on the probability information included in the first map data and the position information on the object included in the second map data, according to one or more embodiments.

Referring to FIG. 8, the matching score for the first map data 20 and the second map data 30 acquired by the processor 140 is 0.032. In this case, assuming that the threshold value, which is the standard for determining that the first traveling space matches the second traveling space, is 0.033, the processor 140 may identify that the acquired matching score (0.032) is less than the preset value (0.033), and the processor 140 may identify that the first traveling space corresponding to the first map data 20 does not match the second traveling space corresponding to the second map data 30. In addition, the processor 140 may delete the first map data 20 stored in the memory 130 and store the second map data 30 in the memory 130.

Meanwhile, the processor 140 may acquire a plurality of matching scores, and when a maximum value of the plurality of acquired matching scores is greater than or equal to the preset value, the processor 140 may identify that the first traveling space matches the second traveling space. Hereinafter, one or more embodiments related to this will be described.

FIGS. 9A through 9D are diagrams illustrating a method of identifying whether a first traveling space matches a second traveling space by rotating second map data at a preset angle, according to one or more embodiments.

Figure 9A:
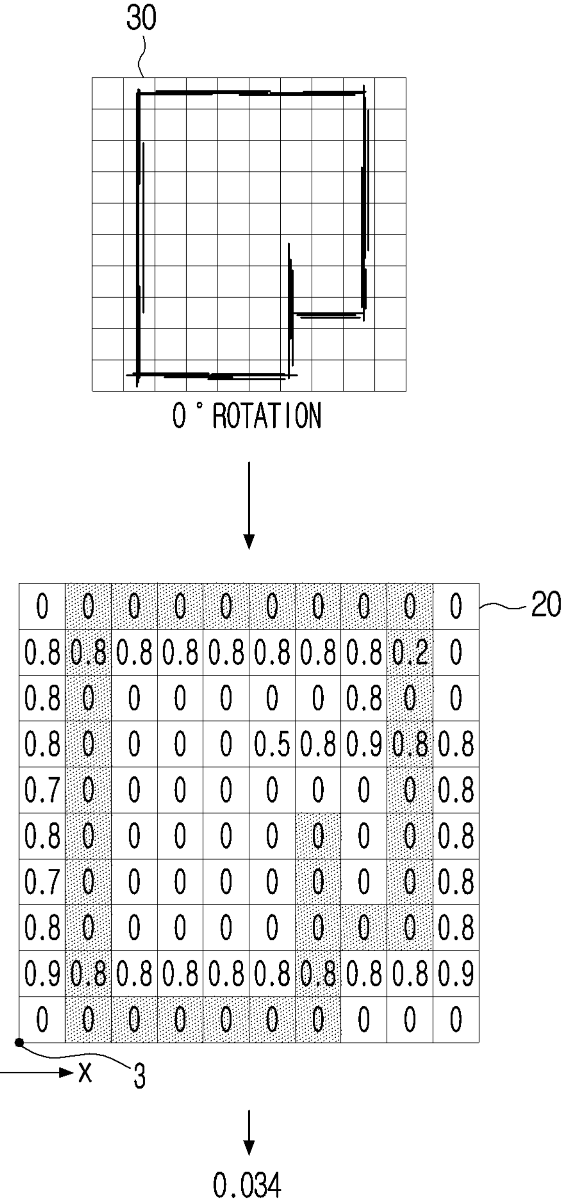
FIGS. 9A to 9D are diagrams illustrating a method of identifying whether the first traveling space matches the second traveling space by rotating the second map data at a preset angle, according to one or more embodiments.
Figure 9B:
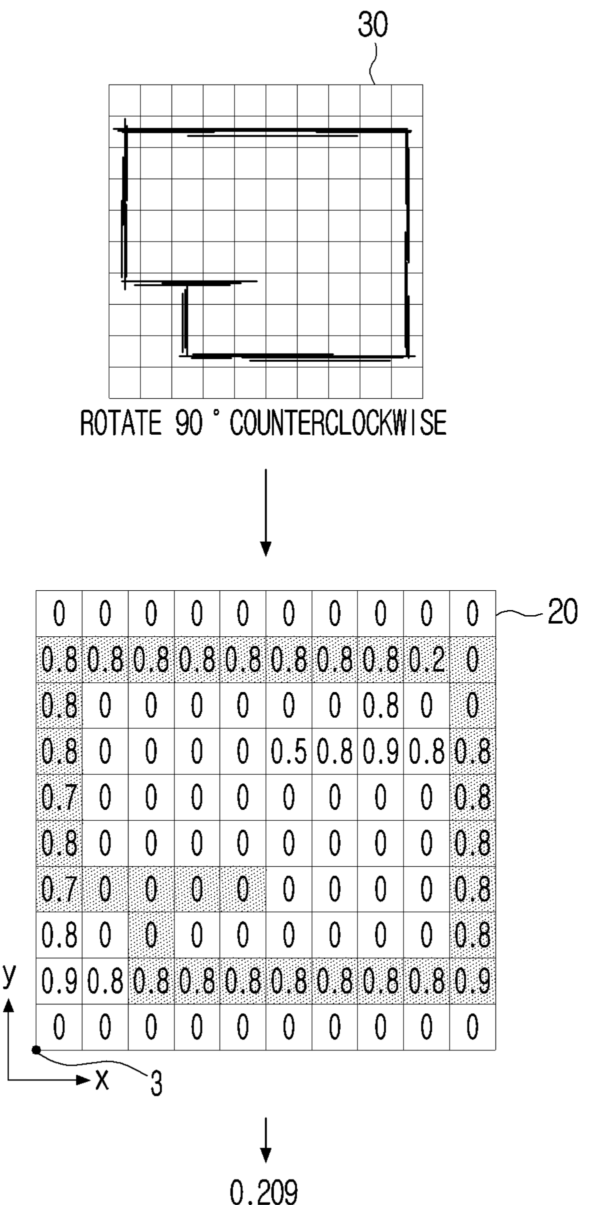
Figure 9C:
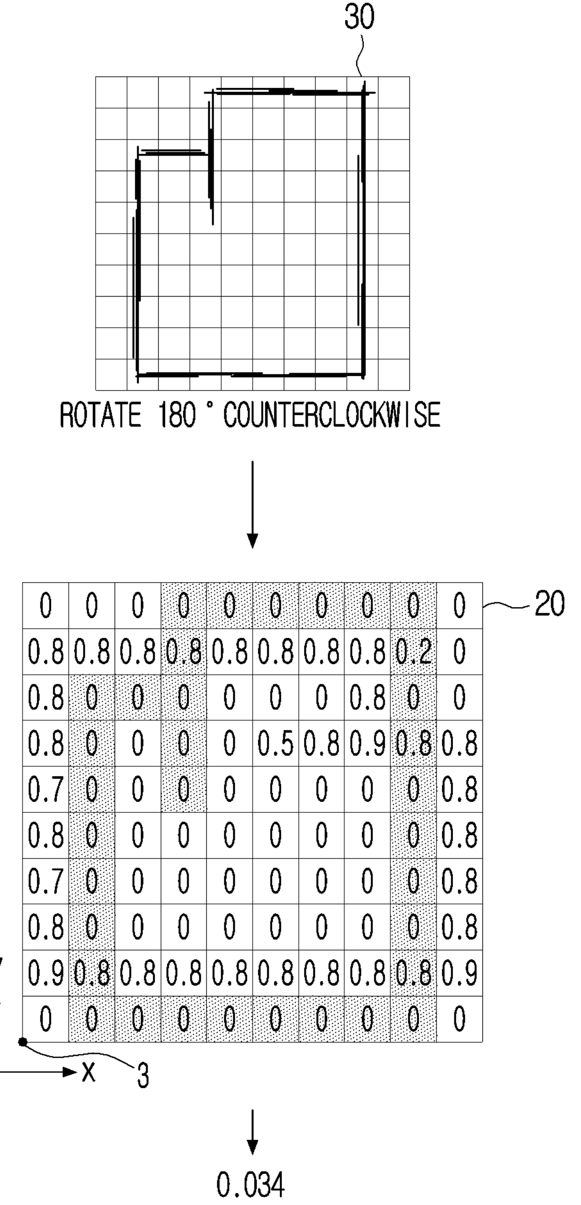
Figure 9D:
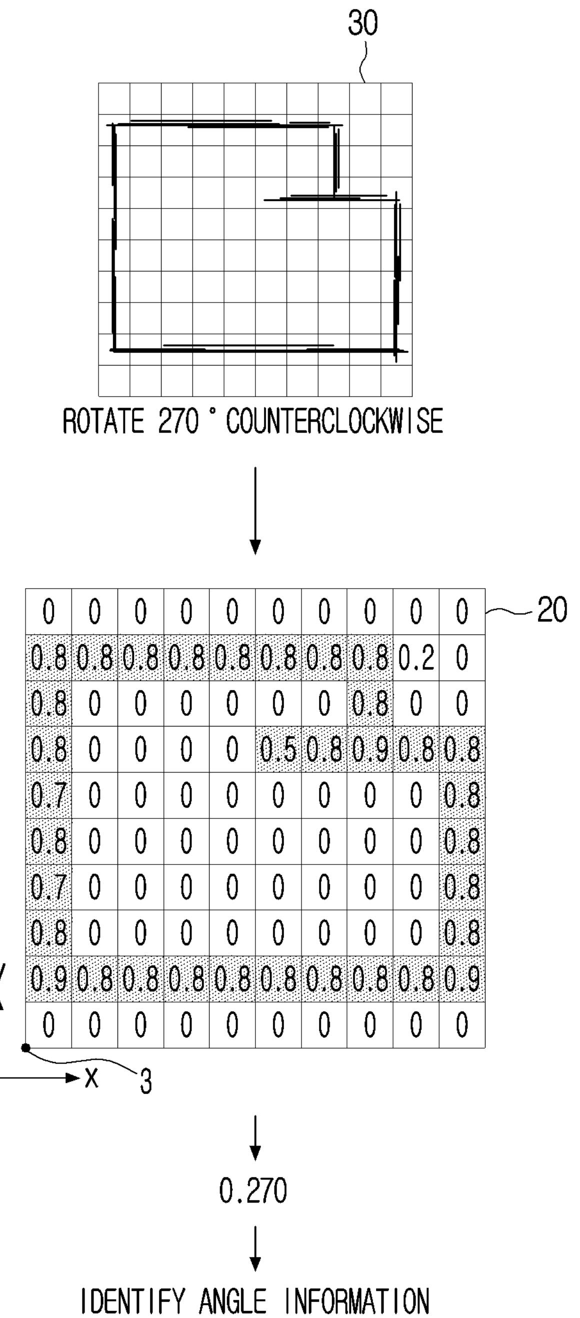

Specifically, FIG. 9A is a diagram illustrating a method of identifying whether the first traveling space matches the second traveling space match without rotating the second map data 30, FIG. 9B is a diagram for describing a method of identifying whether the first traveling space matches the second traveling space match when the second map data 30 rotates by 90° counterclockwise, FIG. 9C is a diagram for describing a method of identifying whether the first traveling space matches the second traveling space when the second map data 30 rotates by 180° counterclockwise, and FIG. 9D is a diagram for describing a method of identifying whether the first traveling space matches the second traveling space match when the second map data 30 rotates by 270° counterclockwise.

According to one or more embodiments, the processor 140 rotates the second map data 30 at the preset angle, and may acquire the average value of the probability values each time the second map data 30 rotates to the preset angle to acquire the plurality of matching scores. In addition, when the matching score having the maximum value among the plurality of matching scores is greater than or equal to the preset value, it may be identified that the first traveling space matches the second traveling space.

Specifically, the processor 140 may acquire the plurality of matching scores of the first map data 20 and the second map data 30. To this end, the processor 140 may rotate the second map data 30 at the preset angle based on a reference point on the first map data 20. In addition, the processor 140 may identify the position of the object in the rotating second map data 30 and the corresponding position on the first map data 20.

Assume that the preset angle is 90° counterclockwise. Referring to FIG. 9A, first, the processor 140 may identify the position of the first map data 20 corresponding to the position of the object in the second map data 30 without rotating the second map data 30 based on the reference point of the first map data 20. Specifically, the processor 140 may identify the position of the area (e.g., the coordinate values of the area) within the first map data 20 that corresponds to the position of the object in the second map data 30. In addition, the processor 140 may identify the probability value corresponding to the identified area, and acquire the average value of the identified probability values as a matching score of 0.034 between the first map data 20 and the second map data 30.

In addition, referring to FIG. 9B, the processor 140 may rotate the second map data 30 by 90° counterclockwise based on the reference point 3 of the first map data 20 and then identify a position corresponding to the position corresponding to the position of the object in the data 30 on the first map data 20. In addition, the processor 140 may identify a probability value corresponding to the identified area in the state in which the second map data 30 rotates by 90° counterclockwise. In addition, the processor 140 may acquire a matching score of 0.209 between the first map data and the second map data 30 in the state in which the second map data 30 rotates by 90° counterclockwise. In this way, the processor 140 may acquire the matching score between the first map data and the second map data 30 each time the second map data 30 rotates by 90° counterclockwise.

Referring to FIG. 9C, the processor 140 may acquire a matching score of 0.034 between the first map data and the second map data 30 in the state in which the second map data 30 rotates by 180° counterclockwise. In addition, referring to FIG. 9D, the processor 9 may acquire a matching score of 0.270 between the first map data and the second map data 30 in the state in which the second map data 30 rotates by 270° counterclockwise. In addition, the processor 140 may identify whether the matching score (0.270) having the maximum value among the plurality of acquired matching scores 0.034, 0.202, 0.034, and 0.270 is greater than or equal to the preset value. In addition, when the processor 140 identifies that the matching score having the maximum value is greater than or equal to the preset value, the first traveling space corresponding to the first map data 20 matches the second traveling space corresponding to the second map data 30.

Meanwhile, according to one or more embodiments, the preset angle may be determined based on the number of valid points. Specifically, as the number of valid points decreases, the number of identified areas corresponding to the positions of the valid points on the second map data 30 may also decrease. In addition, when the number of areas identified on the second map data 30 is small, the area 25 corresponding to the position of the object identified on the first map data 20 may also be small. Accordingly, the processor 140 may set the preset angle to be smaller as the number of valid points decreases to rotate the second map data 30 more frequently on the first map data 20, thereby acquiring a higher matching score. That is, the processor 140 may set the preset angle to be inversely proportional to the number of valid points, thereby identifying in more detail whether the first map data 20 matches the second map data 30.

Meanwhile, according to one or more embodiments, when it is identified that the second traveling space matches the first traveling space, the processor 140 may identify the traveling start position of the robot on the first map data 20 based on the traveling start position of the robot and the position information on the object on the second map data 30.

Figure 10:
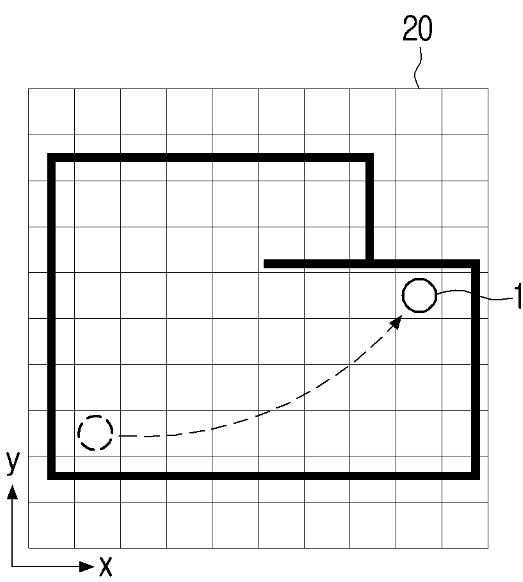
FIG. 10 is a diagram illustrating updating the traveling start position of the robot on the first map data based on the traveling start position of the robot and position information on an object on the second map data, according to one or more embodiments.

FIG. 10 is a diagram illustrating updating a traveling start position of a robot on first map data based on the traveling start position of the robot and position information on an object on second map data, according to one or more embodiments.

Specifically, referring to FIG. 10, when the first map data 20 and the second map data 30 are identified as corresponding to the same traveling space, the processor 140 may set a new traveling start position on the first map data 20. That is, the first traveling start position 1 on the first map data 20 may change to a new traveling start position. To this end, the processor 140 may identify the second traveling start position 2 identified on the second map data 30. The processor 140 may identify the coordinate values of the second traveling start position 2 identified on the second map data 30. In addition, the processor 140 may identify the position of the object on the second map data 30 and identify the position corresponding to the position of the identified object on the first map data 20.

In addition, the processor 140 may identify a conversion function based on the position of the object on the second map data 30 and the position of the object identified on the first map data 20. The processor 140 may identify the coordinate values of the area corresponding to the position of the object on the second map data 30. In addition, the processor 140 may identify an area corresponding to the area of the second map data 30 on the first map data 20 and identify the coordinate values of the area on the identified first map data 20. In addition, the processor 140 may acquire the conversion function based on the coordinate values of the area of the first map data 20 and the coordinate values of the area of the second map data 30, and use the acquired conversion function to convert the coordinate values of the second traveling start position 2 identified on the second map data 30. The processor 140 may identify the converted coordinate value as a new traveling start position on the first map data 20. That is, the processor 140 may identify the first traveling start position 1 by changing the first traveling start position 1 to the converted coordinate value.

Meanwhile, according to one or more embodiments, the processor 140 may acquire the average value each time the second map data 30 rotates at the preset angle, identify a rotation angle corresponding to the average value having the maximum value among the acquired average values, and identify the traveling start position of the robot on the first map data 20 based on the identified rotation angle and the traveling start position of the robot on the second map data 30.

Referring back to FIGS. 9A through 9D, when the processor 140 rotates the second map data 30 by 270° counterclockwise based on a reference point 3 of the first map data 20, the average value obtained, that is, the matching score, has the maximum value. In this case, the processor 140 may identify the rotation angle corresponding to the matching score having the maximum value. That is, the processor 140 may identify a rotation angle of 270° counterclockwise. In addition, the processor 140 may convert the coordinate values of the second traveling start position 2 on the second map data 30 based on the identified rotation angle (270° counterclockwise) and then identify the converted coordinate values as the new traveling start position of the first map data 20. The processor 140 may identify a transformation matrix corresponding to the identified rotation angle and then applies the identified transformation matrix to the coordinate values of the second traveling start position 2 on the second map data 30 to generate coordinate values of a new traveling start position. In addition, the processor 140 may change the first traveling start position 1 of the first map data 20 to the coordinate values of the identified new traveling start position.

Figure 11:
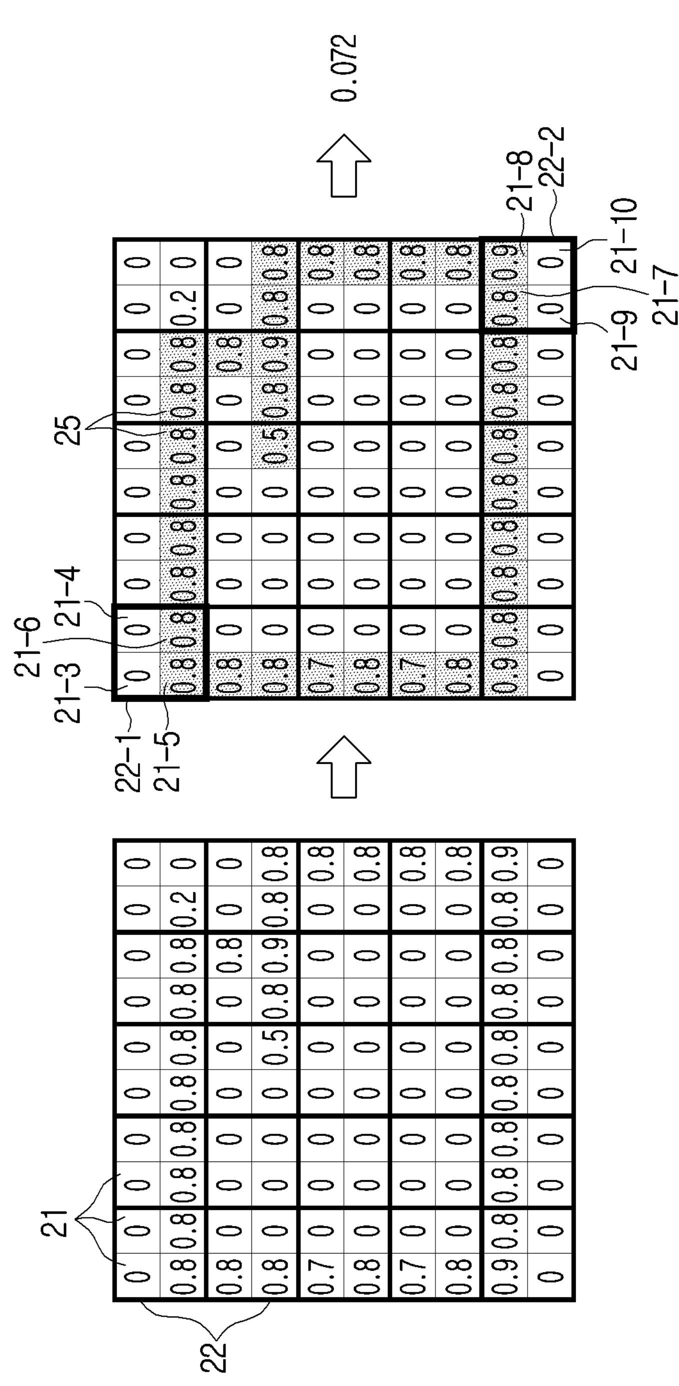
FIG. 11 is a diagram illustrating dividing map data into sub-areas and acquiring a matching score, according to one or more embodiments.

FIG. 11 is a diagram illustrating dividing map data into sub-areas and acquiring a matching score, according to one or more embodiments.

According to one or more embodiments, the first map data 20 stored in the memory 130 may be divided into the plurality of sub-areas 22 including the preset number of areas 21. Here, the sub-area 22 may mean an area including the preset number of adjacent areas among the plurality of areas. In this case, the number of areas included in each of the plurality of sub-areas 22 may be the same.

The processor 140 may apply a voxel (voxel filter) having a preset size to the first map data 20, combine the plurality of areas 21 included in one voxel, and identify the plurality of combined areas 21 as one sub-area 22. In this case, the number of areas included in the subpixel may vary depending on the size of the voxel filter.

FIG. 11 illustrates that the first map data 20 is divided into the plurality of sub-areas 22 including four adjacent areas 21 in the form of a 2×2 matrix. In this case, when the first map data 20 is divided into the plurality of sub-areas 22, the first map data 20 may be divided into the plurality of sub-areas 22 in the form of a 5×5 matrix.

Meanwhile, the processor 140 may identify a probability value corresponding to one of the preset number of areas included in the sub-area 22, and when the area corresponding to the identified position is one of the plurality of areas, apply the matching score to acquire the matching score.

Specifically, the processor 140 may identify probability values for each area 21 based on the probability information corresponding to each of the plurality of areas 21 included in the sub-area 22, and identify one of the plurality of identified probability values as the probability value corresponding to the sub-area 22. In other words, the processor 140 may set the probability value of the sub-area 22 as the probability value for one of the plurality of areas 21 included in the sub-area 22.

In this case, the processor 140 may apply the same standard to the plurality of sub-areas 22 in order to identify the probability value corresponding to the sub-area 22.

Specifically, referring to FIG. 11, it is assumed that the processor 140 identifies a probability value of an area positioned in first column of second row among the plurality of areas 21 included in each sub-area 22 as the probability values corresponding to each sub-area 22. In this case, the processor 140 sets 0.8, which is a probability value of an area 21-5 positioned in first column of second row among four areas 21-3 through 21-6 included in a first sub-area 22-1, as the probability value corresponding to the first sub-area 22-1. In addition, for the second sub-area 22-2 positioned at the bottom right on the first map data 20, the processor 140 may identify "0", which is a probability value of an area 21-9 positioned in first column of second row among four areas 21-7 to 21-10 included in the second sub-area 22-2, as the probability value corresponding to the second sub-area 22-2.

Meanwhile, when the area corresponding to the identified position is one of a plurality of areas including a subpixel, the processor 140 may apply the identified probability value to acquire the matching score.

Specifically, the processor 140 may identify the position of the line data acquired based on the valid point on the point map, and identify the position or coordinate value corresponding to the identified position on the map data. In this case, when the identified positions or coordinate values are included in at least one of the plurality of areas constituting the sub-area 22, the processor 140 may identify that the identified positions or coordinate values are included in the sub-area 22.

In addition, the processor 140 may identify that the identified positions or coordinate values are included in the sub-area 22 even if the remaining areas other than the area corresponding to the probability value set in the sub-area 22 include the identified positions or coordinate values.

Meanwhile, when the identified positions or coordinate values are identified as being included in the sub-area 22, the processor 140 may acquire the probability value set corresponding to the sub-area 22, and acquire the matching score using the acquired probability value.

Referring back to FIG. 11, the processor 140 identified the matching scores of the first map data 20 and the second map data 30 divided into the sub-area 22 as 0.072 ((0.8×9)×100). When acquiring the matching score by dividing the first map data 20 into the plurality of sub-areas 22, the processor 140 may simplify a calculation process for the preset number of areas into a calculation process for one sub-area 22, thereby exhibiting the effect of reducing the time to acquire the matching score.

However, when comparing FIGS. 7 and 11, it can be seen that the matching score acquired when dividing the first map data 20 into the plurality of sub-areas 22 has a lower value than when dividing the first map data 20 into the plurality of areas 21. Accordingly, when identifying whether the first traveling space matches the second traveling space match based on the first map data 20 divided into the sub-area 22, the threshold value may be set to a lower value.

Meanwhile, according to one or more embodiments, the number of areas 21 included in the sub-area 22 may be determined based on the number of valid points.

FIG. 12 is a diagram illustrating increasing the number of areas included in the sub-area based on the number of valid points, according to one or more embodiments.

Specifically, as the number of valid points on the second map data 30 increases, the number of line data acquired based on the valid points may also increase. In addition, as the number of line data increases, the number of times of processes that the processor 140 should perform to identify the position of the line data and the corresponding position on the first map data 20 may also increase. Accordingly, the processor 140 may increase the number of areas 21 included in the sub-area 220 as the number of valid points increases. To this end, the processor 140 may identify the number of valid points on the second map data 30 and determine the size of the voxel filter based on the number of identified valid points.

According to one or more embodiments, when the number of valid points is less than the first value, the processor 140 may set the number of areas included in the sub-area 22 to n2 (n is a natural number of 2 or more), and set n2 plural areas to be included in the sub-area 22 in the form of an n×n matrix. In addition, when the number of valid points is greater than or equal to a first value, the processor 140 may set the number of areas included in the sub-area 22 to m2 (m is a natural number of n or more), and set m2 plural areas to be included in the sub-area 22 in the form of an m×m matrix.

Referring to FIG. 12, when the existing sub-area 22 includes four areas in the form of a 2×2 matrix, as the number of valid points increases, the processor 140 may change nine areas to be included in the sub-area 22 in the form of a 3×3 matrix. In this way, the processor 140 may change the number of areas 21 included in the sub-area 22 based on the number of valid points to quickly determine whether the first traveling space matches the second traveling space.

Meanwhile, in FIGS. 1 through 12, it is illustrated that the processor 140 acquires two-dimensional map data (e.g., first map data 20 and second map data 30) based on the sensing data acquired through the Lidar sensor 110, but it is not limited thereto, and the processor 140 is also capable of acquiring three-dimensional (3D) map data for the traveling space and surrounding environment of the robot 100 based on the sensing data acquired through the 3D Lidar sensor 110.

Figure 13:
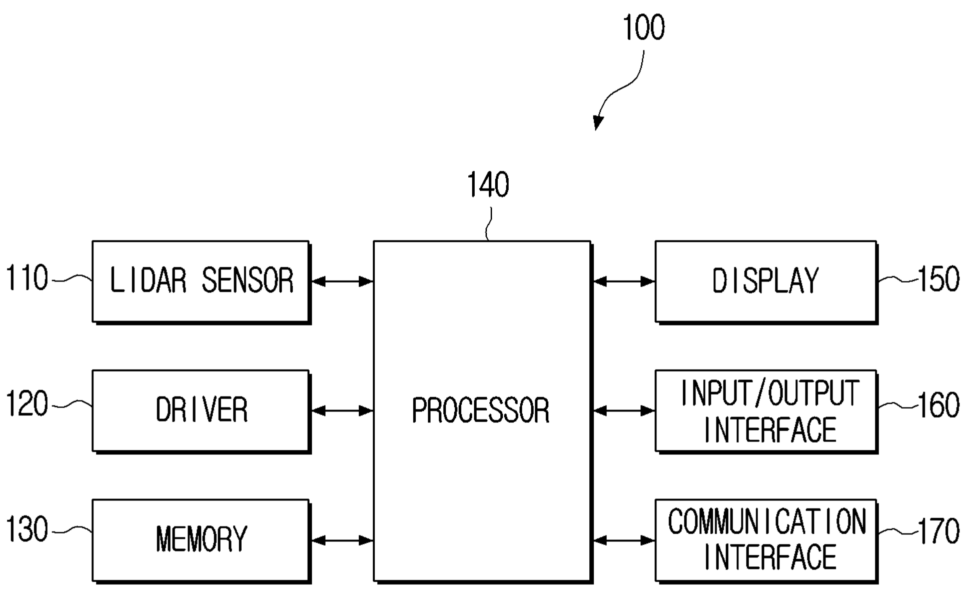
FIG. 13 is a configuration diagram of the robot according to one or more embodiments.

FIG. 13 is a detailed configuration diagram of the robot according to one or more embodiments.

According to one or more embodiments, the robot 100 may include the Lidar sensor 110, the driver 120, the memory 130, the processor 140, a display 150, an input/output interface 160, and a communication interface 170. A detailed description for components overlapped with components illustrated in FIG. 3 among components illustrated in FIG. 11 will be omitted.

The display 150 may display various types of visual information. The processor 140 may display the first map data 20, the second map data 30, and the traveling route information of the robot 100 through the display 150. Meanwhile, the display 150 may be implemented by various types of displays such as a liquid crystal display (LCD), organic light emitting diodes (OLED) display, quantum dot light-emitting diodes (QLED) display, a plasma display panel (PDP), and the like. A driving circuit, a backlight unit, and the like, that may be implemented in a form such as TFT, low temperature poly silicon (LTPS) TFT, an organic TFT (OTFT), and the like, may be included in the display 150. Meanwhile, the display 150 may be implemented as a flexible display, a 3D display, or the like.

The input/output interface 160 is a component used for the robot 100 to interact with a user, and the processor 140 may receive various types of information about a driving space through the input/output interface 160. Meanwhile, the input/output interface 160 may include at least one of a touch sensor, a motion sensor, a button, a jog dial, a switch, a microphone, and a speaker, but is not limited thereto.

The communication interface 170 may input and output various types of data. The communication interface 170 may transmit and receive various types of data to and from an external device (e.g., source device), an external storage medium (e.g., USB memory), an external server (e.g., web hard), etc., through communication methods such as AP-based Wi-Fi (wireless LAN network), Bluetooth, Zigbee, a wired/wireless local area network (LAN), a wide area network (WAN), Ethernet, IEEE 1394, a high-definition multimedia interface (HDMI), a universal serial bus (UBS), a mobile high-definition link (MHL), an audio engineering society/European broadcasting union (AES/EBU), optical, and coaxial.

Figure 14:
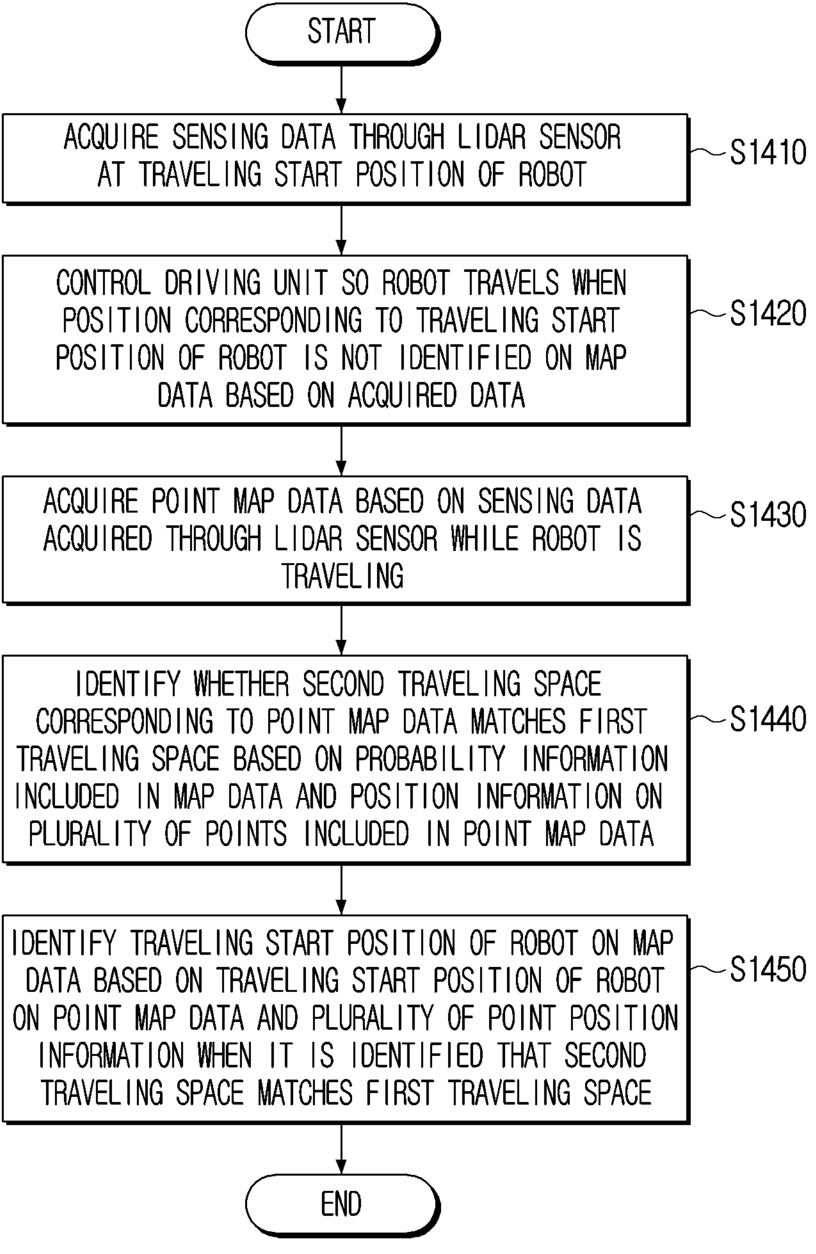
FIG. 14 is a schematic flow chart of a method of controlling a robot according to one or more embodiments.

Meanwhile, FIG. 14 is a flowchart schematically illustrating a robot control method according to one or more embodiments.

Referring to FIG. 14, first, the processor 140 may acquire the sensing data through the Lidar sensor at the traveling start position of the robot (S1410). Specifically, the processor 140 uses the Lidar sensor 110 to acquire the sensing data for the objects around the traveling start position of the robot when it receives a command to turn on the robot or start the traveling of the robot from the user. In this case, the sensing data may include distance data between the robot 100 and the surrounding objects and the point cloud data corresponding to the surrounding objects.

In addition, when the position corresponding to the traveling start position of the robot is not identified on the first map data 20 corresponding to the first traveling space stored in the memory 130 based on the acquired data, the processor 140 may control the driver 120 so that the robot travels (S1420).

Specifically, the processor 140 may identify whether the current position of the robot 100 matches the first traveling start position 1 set in the first map data 20 stored in the memory 130 based on the acquired sensing data. In addition, when the processor 140 identifies that the first traveling start position 1 set in the first map data 20 does not match the current position of the robot 100, the processor 140 may identify that the traveling space in which the robot is positioned has changed. That is, it may be identified that the traveling space where the robot is positioned has changed from the first traveling space to the second traveling space. In addition, the processor 140 may control the driver 120 so that the robot 100 travels the second traveling space identified as the new traveling space. That is, the processor 140 may perform a process of collecting data to generate the map data for the second traveling space which is the new traveling space.

In addition, the processor 140 may acquire the second map data 30 based on the sensing data acquired through the Lidar sensor 110 while the robot is traveling (S1430).

Specifically, the processor 140 may use the Lidar sensor 110 to acquire the point map data 40 for the second traveling space, and apply the SLAM algorithm to the acquired point map data 40 to acquire the second map data 30 corresponding to the second traveling space. To this end, the processor 140 may use various SLAM algorithms.

In addition, the processor 140 may identify whether the second traveling space corresponding to the second map data 30 matches the first traveling space based on the probability information included in the first map data 20 and the position information on the object included in the second map data 30 (S1440).

Specifically, the processor 140 may identify the position of the object on the second map data 30 and identify the position on the first map data 20 corresponding to the identified position. Here, by identifying the position of the object and the corresponding position on the first map data 20, it may be determined whether the object identified on the second map data 30 is identified on the first map data 20. That is, it is the process (localization) of recognizing the position of the object on the second map data 30 as the position on the first map data 20, so that it may be determined that the object identified on the second map data 30 is recognized on the first map data 20.

Meanwhile, the processor 140 may use the probability information included in the first map data 20 to determine whether the object identified on the second map data 30 is identified on the first map data 20. Here, the probability information may be the probability value that the object may exist at the specific position on the first map data 20. The processor 140 may identify based on the probability information that the first map data 20 and the second map data 30 correspond to the same traveling space when it is identified that the object exists in the position identified on the first map data 20.

In addition, when it is identified that the second traveling space matches the first traveling space, the processor 140 may identify the traveling start position of the robot on the map data based on the traveling start position of the robot and the position information on the object on the second map data 30 (S1450).

Specifically, when the processor 140 identifies that the first map data 20 and the second map data 30 are for the same traveling space, the processor may change the first traveling start position 1 set on the first map data 20 to the new traveling start position based on the second traveling start position 2 and the position information on the object on the second map data 30.

Meanwhile, the above-described methods according to one or more embodiments may be implemented in a form of application that may be installed in the existing electronic device.

In addition, the above-described methods according to one or more embodiments may be implemented only by software upgrade or hardware upgrade of the existing electronic device.

Further, one or more embodiments described above may also be performed through an embedded server included in the electronic device or an external server of at least one of the electronic device or the display device.

Meanwhile, according to one or more embodiments described above may be implemented by software including instructions stored in a machine-readable storage medium (for example, a computer-readable storage medium). A machine is a device capable of calling a stored instruction from a storage medium and operating according to the called instruction, and may include the electronic device of the disclosed embodiments. In the case in which a command is executed by the processor 140, the processor 140 may directly perform a function corresponding to the command or other components may perform the function corresponding to the command under a control of the processor 140. The command may include codes created or executed by a compiler or an interpreter. The machine-readable storage medium may be provided in a form of a non-transitory storage medium. Here, the term "non-transitory" means that the storage medium is tangible without including a signal, and does not distinguish whether data are semi-permanently or temporarily stored in the storage medium.

In addition, according to one or more embodiments, the above-described methods may be included and provided in a computer program product. The computer program product may be traded as a product between a seller and a purchaser. The computer program product may be distributed in a form of a storage medium (such as, a compact disc read only memory (CD-ROM)) that may be read by the machine or online through an application store (for example, PlayStore™). In case of the online distribution, at least a portion of the computer program product may be at least temporarily stored in a storage medium such as the memory 130 of a server of a manufacturer, a server of an application store, or a relay server or be temporarily generated.

In addition, each of components (such as, modules or programs) according to one or more embodiments described above may include a single entity or a plurality of entities, and some of the corresponding sub-components described above may be omitted or other sub-components may be further included in the diverse embodiments. Alternatively or additionally, some components (such as, a module or a program) may be integrated into a single entity to perform the same or similar functions performed by each corresponding constituent element prior to the integration. Operations performed by the modules, the programs, or the other components according to various embodiments may be executed in a sequential manner, a parallel manner, an iterative manner, or a heuristic manner, at least some of the operations may be performed in a different order or be omitted, or other operations may be added.

While the disclosure has been illustrated and described with reference to one or more embodiments, it will be understood that the one or more embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiments described herein may be used in conjunction with any other embodiments described herein.

What is claimed is:

1. A robot, comprising:

a light and detection ranging ("Lidar") sensor;

a driver comprising a motor;

a memory configured to store first map data corresponding to a first traveling space; and at least one processor configured to:

acquire sensing data through the Lidar sensor at a traveling start position of the robot, control the driver to move the robot in a state in which a position corresponding to the traveling start position of the robot is not identified on the first map data based on the acquired sensing data, acquire second map data based on the sensing data acquired through the Lidar sensor while the robot is moving, acquire point map data corresponding to a second traveling space through the Lidar sensor, identify as one or more valid points in the point map data based on a preset probability value, acquire position information on one or more objects included in the second map data based on position information of the identified one or more valid points, identify whether the second traveling space corresponding to the second map data matches the first traveling space based on probability information included in the first map data and the position information on one or more objects included in the second map data, and identify the traveling start position of the robot on the first map data based on the traveling start position of the robot on the second map data and the position information on the one or more objects in a state in which it is identified that the second traveling space matches the first traveling space.

2. The robot of claim 1, wherein the one or more valid points comprises points which are greater than or equal to the preset value among a plurality of points included in the point map data.

3. The robot of claim 1, wherein the first map data is divided into a plurality of areas having a preset size and includes probability information corresponding to each area, and wherein the at least one processor is further configured to:

identify areas corresponding to positions of the one or more objects on the first map data based on the position information of the one or more valid points;

identify probability values corresponding to the identified areas based on the probability information; and identify whether the second traveling space corresponding to the second map data matches the first traveling space based on the probability values included in the identified areas and the position information on one or more objects included in the second map data.

4. The robot of claim 3, wherein a state in which an average value of the probability values is greater than or equal to a threshold value, the at least one processor is further configured to identify that the second traveling space matches the first traveling space.

5. The robot of claim 4, wherein a state in which the average value of the probability values is less than the threshold value, the at least one processor is further configured to update the first map data stored in the memory to map data corresponding to the second map data.

6. The robot of claim 3, wherein the at least one processor is further configured to:

rotate the second map data at a preset angle, acquire average values of the probability values each time the second map data rotates at the preset angle;

identify a rotation angle corresponding to an average value having a maximum value among the acquired average values of the probability values;

identify the traveling start position of the robot on the first map data based on the identified rotation angle; and identify the traveling start position of the robot on the second map data.

7. The robot of claim 3, wherein the first map data is divided into a plurality of sub-areas including a preset plurality of areas, and wherein the at least one processor is further configured to:

identify a probability value corresponding to any one of the preset plurality of areas included in the plurality of sub-areas; and apply the identified probability value to acquire the matching score when the identified area corresponds to at least one of the plurality of areas in the plurality of sub-areas.

8. The robot of claim 7, wherein the preset plurality of areas included in the plurality of sub-areas is determined based on the one or more valid points.

9. The robot of claim 1, wherein the at least one processor is further configured to:

acquire a matching score between the first map data and the second map data based on the acquired position information on the one or more objects and the probability information; and identify whether the second traveling space matches the first traveling space based on the acquired matching score.

10. A method for controlling a robot, comprising:

acquiring sensing data through a light and detection ranging ("Lidar") sensor at a traveling start position of the robot;

moving the robot in a state in which a position corresponding to the traveling start position of the robot is not identified on a first map data corresponding to a first traveling space stored in a memory of the robot based on the acquired sensing data;

acquiring second map data based on the acquired sensing data through the Lidar sensor while the robot is moving;

acquiring point map data corresponding to a second traveling space through the Lidar sensor;

identifying whether the second traveling space corresponding to the second map data matches the first traveling space based on probability information included in the first map data and position information on one or more objects included in the second map data; and identifying the traveling start position of the robot on the first map data based on the traveling start position of the robot on the second map data and the position information on the one or more objects in a state in which it is identified that the second traveling space matches the first traveling space, wherein the identifying whether the second traveling space corresponding to the second map data matches the first traveling space comprises:

identifying one or more valid points in the point map data based on a preset probability value;

acquiring the position information on the one or more objects included in the second map data based on position information of the identified one or more valid points.

11. The method for controlling a robot of claim 10, further comprising:

wherein the one or more valid points comprises points which are greater than or equal to the preset value among a plurality of points included in the point map data.

12. The method for controlling a robot of claim 10, further comprising:

dividing the first map data into a plurality of areas having a preset size and including probability information corresponding to each area, wherein the acquiring of the matching score comprises:

identifying areas corresponding to positions of the one or more objects on the first map data based on the position information of the one or more valid points;

identifying probability values corresponding to the identified areas based on the probability information; and identifying whether the second traveling space corresponding to the second map data matches the first traveling space based on the probability values included in the identified areas and the position information on one or more objects included in the second map data.

13. The method for controlling a robot of claim 12, wherein the identifying of whether the second traveling space matches the first traveling space comprises identifying that the second traveling space matches the first traveling space in a state in which an average value of the probability values is greater than or equal to a threshold value.

14. The method for controlling a robot of claim 13, wherein the identifying of whether the second traveling space matches the first traveling space further comprises updating the first map data stored in the memory to map data corresponding to the second map data in a state in which the average value of the probability values is less than the threshold value.

15. The method for controlling a robot of claim 12, wherein the identifying whether the second traveling space matches the first traveling space comprises:

rotating the second map data at a preset angle;

acquiring average values of the probability values each time the second map data rotates at the preset angle; and identifying a rotation angle corresponding to an average value having a maximum value among the acquired average values of the probability values, and wherein the identifying of the traveling start position of the robot on the first map data comprises identifying the traveling start position of the robot on the first map data based on the identified rotation angle and the traveling start position of the robot on the second map data.

16. The method for controlling a robot of claim 12, further comprising:

dividing the first map data into a plurality of sub-areas including a preset plurality of areas, wherein the identifying whether the second traveling space matches the first traveling space comprises:

identifying a probability value corresponding to any one of the preset plurality of areas included in the plurality of sub-areas; and applying the identified probability value to acquire the matching score when the identified area corresponds to one of the plurality of areas in the plurality of sub-areas.

17. The method for controlling a robot of claim 16, wherein before the dividing the first map data into a plurality of sub-areas including a preset plurality of areas, the method for controlling the robot further comprises determining the preset plurality of areas included in the plurality of sub-areas based on the one or more valid points.

18. The method for controlling a robot of claim 10, further comprising:

acquiring a matching score between the first map data and the second map data based on the acquired position information on the one or more objects and the probability information; and identifying whether the second traveling space matches the first traveling space based on the acquired matching score.

* * * * *